US012620346B2

(12) United States Patent
Park et al.

(10) Patent No.: US 12,620,346 B2
(45) Date of Patent: May 5, 2026

(54) DISPLAY DEVICE WITH DRIVING CURRENT MODULATION USING PULSE AMPLITUDE MODULATION AND PULSE WIDTH MODULATION

(71) Applicant: LG Display Co., Ltd., Seoul (KR)

(72) Inventors: Jaemin Park, Ansan-si (KR); JongBeom Lee, Paju-si (KR); Soyi Lee, Paju-si (KR); Seeun Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/912,433

(22) Filed: Oct. 10, 2024

(65) Prior Publication Data

US 2025/0174178 A1 May 29, 2025

(30) Foreign Application Priority Data

Nov. 27, 2023 (KR) ........................ 10-2023-0166454

(51) Int. Cl.
*G09G 3/32* (2016.01)

(52) U.S. Cl.
CPC ........... *G09G 3/32* (2013.01); *G09G 2310/08* (2013.01); *G09G 2320/0233* (2013.01); *G09G 2320/0633* (2013.01); *G09G 2320/064* (2013.01)

(58) Field of Classification Search
CPC ....... G09G 3/2003–204; G09G 3/2074; G09G 3/2077; G09G 3/32–3291; G09G 2300/04; G09G 2300/0408; G09G 2300/0421–043; G09G 2300/0804; G09G 2300/0814; G09G 2310/0235; G09G 2310/0243; G09G 2310/0264; G09G 2310/0267; G09G 2310/0291; G09G 2310/06; G09G 2310/08; G09G 2320/0233; G09G 2320/0242; G09G 2320/0626–0646
See application file for complete search history.

(56) References Cited

U.S. PATENT DOCUMENTS

| | | | | |
|---|---|---|---|---|
| 2019/0371232 | A1* | 12/2019 | Kim | G09G 3/2014 |
| 2020/0111403 | A1* | 4/2020 | Kim | G09G 3/2081 |
| 2022/0301500 | A1* | 9/2022 | Shigeta | G09G 3/32 |
| 2023/0012711 | A1* | 1/2023 | Kim | G09G 3/32 |

FOREIGN PATENT DOCUMENTS

KR 10-2021-0108742 A 9/2021

* cited by examiner

*Primary Examiner* — Nathan Danielsen
(74) *Attorney, Agent, or Firm* — Fenwick & West LLP

(57) ABSTRACT

According to an aspect of the present disclosure, a display device includes a display panel in which a plurality of pixel groups is defined; one PAM circuit disposed in each of the plurality of pixel groups; a plurality of PWM circuits which is disposed in each of the plurality of pixel groups and is connected to one PAM circuit; a plurality of light emitting diodes which is disposed in each of the plurality of pixel groups and is connected to the plurality of PWM circuits. The plurality of PWM circuits is connected to an output terminal of one PAM circuit in parallel in each of the plurality of pixel groups. Accordingly, the plurality of PWM circuits shares one PAM circuit to reduce the number of overall transistors and simplify the structure of the display device.

25 Claims, 21 Drawing Sheets

DISPLAY DEVICE WITH DRIVING CURRENT MODULATION USING PULSE AMPLITUDE MODULATION AND PULSE WIDTH MODULATION

CROSS-REFERENCE TO RELATED APPLICATION

This application claims the priority of Republic of Korea Patent Application No. 10-2023-0166454 filed on Nov. 27, 2023, which is hereby incorporated by reference in its entirety.

BACKGROUND

Field

The present disclosure relates to a display device and more particularly, to a display device which simplifies a structure of a pixel circuit.

Description of the Related Art

As display devices which are used for a monitor of a computer, a television, a cellular phone, or the like, there are an organic light emitting display (OLED) device which is a self-emitting device, a liquid crystal display (LCD) device which requires a separate light source, and the like.

An applicable range of the display device is diversified to personal mobile devices as well as monitors of computers and televisions and a display device with a large display area and a reduced volume and weight is being studied.

In the meantime, various types of display elements may be used for the display device and in recent years, a light emitting diode (LED) or a micro-LED (micro light-emitting diode) which is formed of an inorganic material to have a high reliability and excellent luminous efficiency is being used. Further, a pixel circuit which drives the LED is configured by a pulse amplitude modulation (PAM) method which expresses a gray scale level with an amplitude of a driving current and/or a pulse width modulation (PWM) method which expresses a gray scale level with a pulse width of a driving current.

SUMMARY

An object to be achieved by the present disclosure is to provide a display device in which a plurality of sub pixels shares one PAM circuit to reduce the number of transistors.

Another object to be achieved by the present disclosure is to provide a display device in which the number of transistors disposed in each of the plurality of sub pixels is reduced to reduce a design area of each sub pixel.

Still another object to be achieved by the present disclosure is to provide a display device in which a design area of each of a plurality of sub pixels is reduced to implement a high resolution.

Still another object to be achieved by the present disclosure is to provide a display device in which color coordinate distortion of a light emitting diode in a low current band is minimized.

Still another object to be achieved by the present disclosure is to provide a display device in which an emission timing of each of a plurality of sub pixels which shares a PAM circuit may be individually controlled.

Still another object to be achieved by the present disclosure is to provide a display device which compensates for a threshold voltage of a driving transistor of each of a PAM circuit and a PWM circuit using an external compensation method.

Still another object to be achieved by the present disclosure is to provide a display device which compensates for a threshold voltage of a driving transistor of each of a PAM circuit and a PWM circuit using an internal compensation method.

Objects of the present disclosure are not limited to the above-mentioned objects, and other objects, which are not mentioned above, can be clearly understood by those skilled in the art from the following descriptions.

In order to achieve the objects as described above, according to an embodiment of the present disclosure, a display device comprises: a display panel including a plurality of pixel groups, each of the plurality of pixel groups including a plurality of light emitting diodes; a plurality of pulse amplitude modulation (PAM) circuits, each PAM circuit connected to one pixel group from the plurality of pixel groups; a set of pulse width modulation (PWM) circuits, wherein a corresponding plurality of PWM circuits from the set are included in each of the plurality of pixel groups and are connected to the PAM circuit that is connected to the pixel group and connected to the plurality of light emitting diodes that are included in the pixel group, wherein in each of the plurality of pixel groups, the corresponding plurality of PWM circuits are connected in parallel to an output terminal of the PAM circuit that is connected to the pixel group. Accordingly, the plurality of PWM circuits shares one PAM circuit to reduce the number of overall transistors and simplify the structure of the display device.

In one embodiment, a display device comprises: a plurality of light emitting elements that emit a same color of light; a pulse amplitude modulation (PAM) circuit, the PAM including a first driving transistor that controls an intensity of a driving current that is generated by the PAM circuit based on a first data voltage; and a plurality of pulse width modulation (PWM) circuits that are electrically connected to the PAM circuit and receive the driving current generated by the PAM circuit, each of the PWM circuits including a second driving transistor that is connected to a corresponding light emitting element from the plurality of light emitting elements and controls a duration of time that the driving current from the PAM circuit is supplied to the corresponding light emitting element based on a second data voltage that has a magnitude that is image dependent.

Other detailed matters of the exemplary embodiments are included in the detailed description and the drawings.

According to the present disclosure, a plurality of sub pixels shares one PAM circuit to reduce the number of transistors.

According to the present disclosure, the number of transistors disposed in each of the plurality of sub pixels is reduced to reduce a design area of the sub pixel.

According to the present disclosure, a design area of each of the plurality of sub pixels is reduced to implement a display device with a high resolution.

According to the present disclosure, a driving current excluding a low current band is supplied to a light emitting diode in which color coordinate distortion occurs to minimize the color coordinate distortion.

According to the present disclosure, an emission timing and a gray scale level of each of a plurality of sub pixels which share one PAM circuit may be individually controlled.

According to the present disclosure, an external compensation method which directly senses and compensates for a threshold voltage of a driving transistor of each of a PAM circuit and a PWM circuit is used to reduce a luminance difference between the plurality of sub pixels.

According to the present disclosure, an internal compensation method which internally samples and compensates for a threshold voltage of a driving transistor of each of a PAM circuit and a PWM circuit is used to reduce a luminance difference between the plurality of sub pixels.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
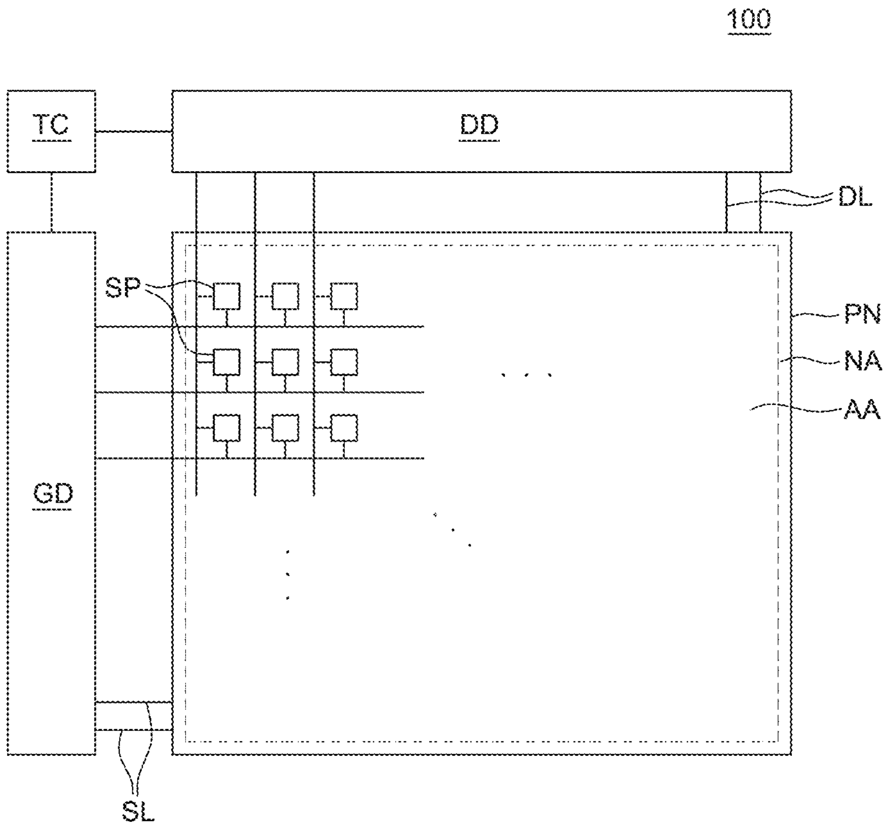
FIG. 1 is a schematic diagram of a display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "comprising" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, an exemplary embodiments of the present disclosure will be described in detail with reference to accompanying drawings.

FIG. 1 is a schematic diagram of a display device according to an exemplary embodiment of the present disclosure. In FIG. 1, for the convenience of description, among various components of the display device 100, a display panel PN, a gate driver GD, a data driver DD, and a timing controller TC are illustrated.

Referring to FIG. 1, the display device 100 includes the display panel PN including a plurality of sub pixels SP, the gate driver GD and the data driver DD which supply various signals to the display panel PN, and the timing controller TC which controls the gate driver GD and the data driver DD.

The gate driver GD supplies a plurality of scan signals to a plurality of scan lines SL according to a plurality of gate control signals supplied from the timing controller TC. Even though in FIG. 1, it is illustrated that one gate driver GD is disposed to be spaced apart from one side of the display panel PN, the number of the gate drivers GD and the placement thereof are not limited thereto.

The data driver DD supplies a data voltage to a plurality of data lines DL according to a plurality of data control signals and image data supplied from the timing controller TC. The data driver DD may convert the image data into a data voltage using a reference gamma voltage and supply the converted data voltage to the plurality of data lines DL.

The timing controller TC aligns image data input from the outside to supply the image data to the data driver DD. The timing controller TC may generate a gate control signal and a data control signal using synchronization signals input from the outside, such as a dot clock signal, a data enable signal, and horizontal/vertical synchronization signals. The timing controller TC supplies the generated gate control signal and data control signal to the gate driver GD and the data driver DD, respectively, to control the gate driver GD and the data driver DD.

The display panel PN is a configuration which displays images to the user and includes the plurality of sub pixels SP. In the display panel PN, the plurality of scan lines SL and the plurality of data lines DL intersect each other and the plurality of sub pixels SP may be formed at intersections of the scan lines SL and the data lines DL.

In the display panel PN, an active area AA and a non-active area NA may be defined.

The active area AA is an area in which images are displayed in the display device 100. In the active area AA, a plurality of sub pixels SP which configure a plurality of pixels and a pixel circuit for driving the plurality of sub pixels SP may be disposed. The plurality of sub pixels SP is a minimum unit which configures the active area AA and n sub pixels SP may form one pixel. In each of the plurality of sub pixels SP, a thin film transistor for driving the plurality of light emitting diodes EL may be disposed. The plurality of light emitting diodes EL may be defined in different ways depending on the type of the display panel PN. For example, when the display panel PN is an inorganic light emitting display panel PN, the light emitting diode EL may be a light emitting diode (LED) or a micro light emitting diode (micro-LED).

In the active area AA, a plurality of signal lines which transmit various signals to the plurality of sub pixels SP is disposed. For example, the plurality of signal lines may include a plurality of data lines DL which supplies a data voltage to each of the plurality of sub pixels SP and a plurality of scan lines SL which supplies a scan signal to each of the plurality of sub pixels SP. The plurality of scan lines SL extends to one direction in the active area AA to be connected to the plurality of sub pixels SP and the plurality of data lines DL extends to a direction different from the one direction in the active area AA to be connected to the plurality of sub pixels SP. In addition, in the active area AA, a low potential power line, a high potential power line, and the like may be further disposed, but are not limited thereto.

The non-active area NA is an area where images are not displayed so that the non-active area NA may be defined as an area extending from the active area AA. In the non-active area NA, a link line which transmits a signal to the sub pixel SP of the active area AA, a pad electrode, or a driving IC, such as a gate driver IC or a data driver IC, may be disposed.

In the meantime, the non-active area NA may be located on a rear surface of the display panel PN, that is, a surface on which the sub pixels SP are not disposed or may be omitted, and is not limited as illustrated in the drawing.

In the meantime, a driver, such as the gate driver GD, the data driver DD, and the timing controller TC, may be connected to the display panel PN in various ways. For example, the gate driver GD may be mounted in the non-active area NA in a gate in panel (GIP) manner or mounted between the plurality of sub pixels SP in the active area AA in a gate in active area (GIA) manner.

For example, the data driver DD and the timing controller TC are formed in separate flexible film and printed circuit board. The display panel PN may be electrically connected to the data driver DD and the timing controller TC by bonding the flexible film and the printed circuit board to the pad electrode formed in the non-active area NA of the display panel PN.

As another example, when the gate driver GD is mounted in the active area AA in the GIA manner and a side line which connects the signal line on the front surface of the display panel PN to the pad electrode on a rear surface of the display panel PN is formed to bond the flexible film and the printed circuit board onto a rear surface of the display panel PN, the non-active area NA may be minimized on the front surface of the display panel PN. Therefore, when the gate driver GD, the data driver DD, and the timing controller TC are connected to the display panel PN as described above, a zero bezel with substantially no bezel may be implemented.

Hereinafter, the plurality of sub pixels SP will be described in more detail with reference to FIG. 2.

Figure 2:
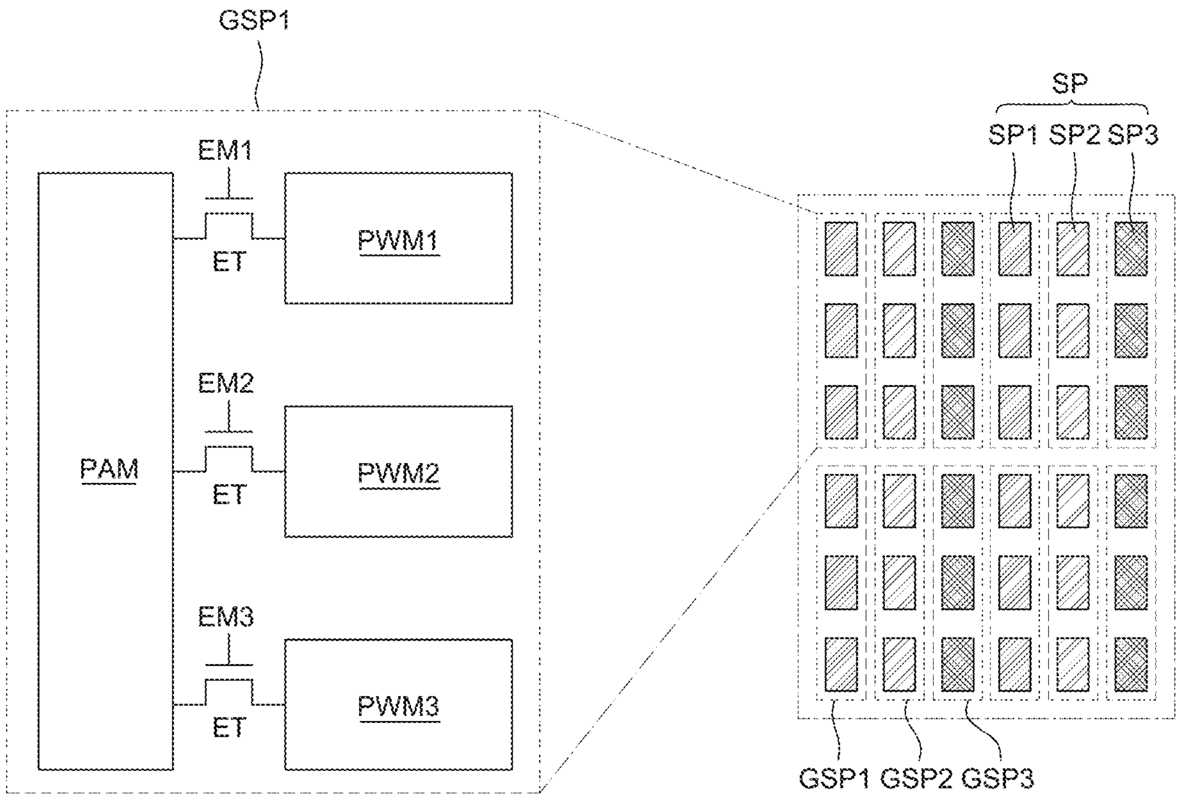
FIG. 2 is a schematic diagram of a sub pixel of a display device according to an exemplary embodiment of the present disclosure.

FIG. 2 is a schematic diagram of a sub pixel of a display device according to an exemplary embodiment of the present disclosure.

Referring to FIG. 2, the plurality of sub pixels SP includes a plurality of first sub pixels SP1, a plurality of second sub pixels SP2, and a plurality of third sub pixels SP3. Each of the plurality of sub pixels SP includes a light emitting diode EL and a pixel circuit to independently emit light. The plurality of sub pixels SP may include a first sub pixel SP1, a second sub pixel SP2, and a third sub pixel SP3 which emit different color light. For example, the first sub pixel SP1 is a red sub pixel that emits red light, the second sub pixel SP2 is a green sub pixel that emits green light, and the third sub pixel SP3 is a blue sub pixel that emits blue light, but it is not limited thereto.

The plurality of first sub pixels SP1 may be disposed to form a plurality of columns and the plurality of second sub pixels SP2 may be disposed in a column adjacent to a column in which the plurality of first sub pixels SP1 is disposed. The plurality of third sub pixels SP3 may be disposed in a column adjacent to columns in which the plurality of first sub pixels SP1 and the plurality of second sub pixels SP2 are disposed. That is, the plurality of first sub pixels SP1, the plurality of second sub pixels SP2, and the plurality of third sub pixels SP3 may be disposed in different columns. Therefore, the plurality of sub pixels SP may be disposed such that the first sub pixels SP1, the second sub pixels SP2, and the third sub pixels SP3 are repeatedly disposed in this order in a row direction.

In the meantime, the plurality of first sub pixels SP1, the plurality of second sub pixels SP2, and the plurality of third sub pixels SP3 may form a plurality of first pixel groups GSP1, a plurality of second pixel groups GSP2, and a plurality of third pixel groups GSP3, respectively. Each of the plurality of pixel groups may be formed by n sub pixels SP. Each of the plurality of pixel groups may include n pulse width modulation (PWM) circuits and one pulse amplitude modulation (PAM) circuit.

In this case, each of the plurality of sub pixels SP includes a PWM circuit PWM, a PAM circuit PAM, and a light emitting diode EL and the PAM circuits PAM of the plurality of sub pixels SP are integrated into one so that the plurality of sub pixels SP may be defined to share one PAM circuit PAM. One pixel group configured by n sub pixels SP may be defined to include n PWM circuits PWM and one PAM circuit PAM (e.g., a single PAM circuit PAM). Thus, the display device includes a set of PWM circuits and a corresponding plurality of PWM circuits from the set are included in each pixel group.

The PWM circuit PWM is a circuit which expresses a gray scale level with a pulse width of a driving current. When the PWM circuit PWM is used, a time when the light emitting diode EL emits light is adjusted by configuring a pulse width of the driving current to be different to display images with various gray scale levels. At this time, the pulse width may be expressed by a duty ratio of a driving current or a duration of the driving current. For example, when an image with a low gray scale level is displayed, the PWM circuit PWM shortens a pulse width of the driving current, for example, shortens the duty ratio of the driving current or the duration of outputting the driving current to reduce the emission period of the light emitting diode EL and display the image with a low gray scale level. In contrast, when an image with a high gray scale level is displayed, the PWM circuit PWM increases a pulse width of the driving current, for example, increases the duty ratio of the driving current or the duration of outputting the driving current to increase the emission period of the light emitting diode EL and display the image with a high gray scale level.

The PAM circuit PAM is a circuit which expresses a gray scale level with an amplitude of a driving current. When the PAM circuit PAM is used, a time when the light emitting diode EL emits light is adjusted by configuring an amplitude of the driving current, that is, an intensity of the driving current to be different to display images with various gray scale levels. For example, when an image with a low gray scale level is displayed, the PAM circuit PAM lowers the intensity of the driving current to lower a luminance of light emitted from the light emitting diode EL and display an image with a low gray scale. In contrast, when an image with a high gray scale level is displayed, the PAM circuit PAM increases the intensity of the driving current to increase a luminance of light emitted from the light emitting diode EL and display an image with a high gray scale level.

Referring to FIG. 2 again, each of the plurality of first pixel groups GSP1 may include n first sub pixels SP1 disposed in the same column. Each of the plurality of first pixel groups GSP1 may include n first sub pixels SP1 which are continuously disposed in the same column and each of n first sub pixels SP1 may include a PAM circuit PAM and a PWM circuit PWM. In one embodiment, n first sub pixels SP1 may share one PAM circuit PAM. Specifically, each of n first sub pixels SP1 which form one first pixel group GSP1 may include a corresponding PWM circuit PWM which independently operates from the other PWM circuits. At this time, n first sub pixels SP1 may share one PAM circuit PAM. Therefore, one first sub pixel SP1 includes one PAM circuit PAM and n PWM circuits PWM of n first sub pixels SP1 may be connected to one PAM circuit PAM in parallel.

That is, in the first pixel group GSP1, n PWM circuits PWM and one PAM circuit PAM may be disposed to drive n first sub pixels SP1. For example, the first pixel group GSP1 may include one PAM circuit PAM and a plurality of PWM circuits PWM and the plurality of PWM circuits PWM may include a first PWM circuit PWM1, a second PWM circuit PWM2, and a third PWM circuit PWM3.

At this time, an emission control transistor ET may be connected between each of the plurality of PWM circuits PWM and the PAM circuit PAM. For example, a first emission control transistor ET which is turned on or turned off by a first emission control signal EM1 may be connected between the first PWM circuit PWM1 and the PAM circuit PAM. A second emission control transistor ET which is turned on or turned off by a second emission control signal EM2 may be connected between the second PWM circuit PWM2 and the PAM circuit PAM. A third emission control transistor ET which is turned on or turned off by a third emission control signal EM3 may be connected between the third PWM circuit PWM3 and the PAM circuit PAM. The plurality of emission control transistors ET may control a driving timing of each of the plurality of PWM circuits PWM, which will be described in more detail with reference to FIG. 3.

The plurality of second pixel groups GSP2 and the plurality of third pixel groups GSP3 may be formed with the substantially same configuration as the plurality of first pixel groups GSP1.

Specifically, each of the plurality of second pixel groups GSP2 may include n second sub pixels SP2 disposed in the same column. Each of the plurality of second pixel groups GSP2 may include n second sub pixels SP2 which are continuously disposed in the same column and each of n second sub pixels SP2 may include a PAM circuit PAM and a PWM circuit PWM. At this time, the PAM circuits PAM of n second sub pixels SP2 are integrated so that n second sub pixels SP2 may share one PAM circuit PAM. Specifically, each of n second sub pixels SP2 which form one second pixel group GSP2 may include PWM circuits PWM which independently operate. N second sub pixels SP2 may share one PAM circuit PAM. Therefore, in one second pixel group GSP2, n PWM circuits PWM and one PAM circuit PAM may be disposed to drive n second sub pixels SP2.

Each of the plurality of third pixel groups GSP3 may include n third sub pixels SP3 disposed in the same column. Each of the plurality of third pixel groups GSP3 may include n third sub pixels SP3 which are continuously disposed in the same column and each of n third sub pixels SP3 may include a PAM circuit PAM and a PWM circuit PWM. At this time, the PAM circuits PAM of n third sub pixels SP3 are integrated so that n third sub pixels SP3 may share one PAM circuit PAM. Specifically, each of n third sub pixels SP3 which form one third pixel group GSP3 may include a PWM circuit PWM which independently operates. N third sub pixels SP3 may share one PAM circuit PAM. Therefore, in one third pixel group GSP3, n PWM circuits PWM and one PAM circuit PAM may be disposed to drive n third sub pixels SP3.

Even though in FIG. 2, it is illustrated that three sub pixels SP are included in one pixel group, this is illustrative and the number of sub pixels SP which are included in one pixel group is not limited thereto.

Hereinafter, a PAM circuit PAM and a PWM circuit PWM which form one pixel group will be described in detail with reference to FIG. 3.

Figure 3:
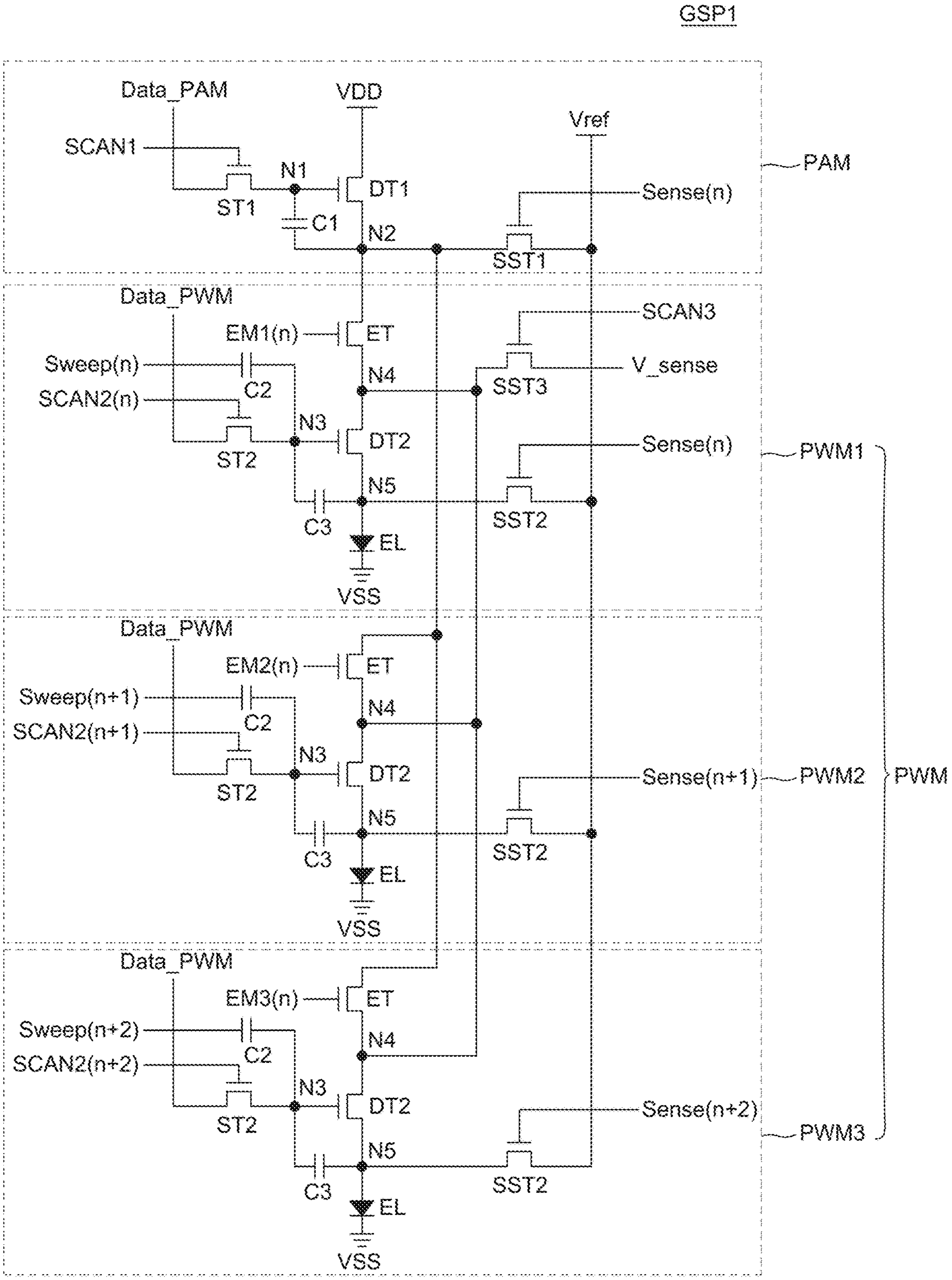
FIG. 3 is a circuit diagram of a first pixel group of a display device according to an exemplary embodiment of the present disclosure.

FIG. 3 is a circuit diagram of a first pixel group of a display device according to an exemplary embodiment of the present disclosure. Even though in FIG. 3, a circuit diagram of a first pixel group GSP1 among the plurality of pixel groups is illustrated, circuit diagrams of the second pixel group GSP2 and the third pixel group GSP3 are the substantially same as the circuit diagram of the first pixel group GSP1.

Referring to FIG. 3, a plurality of transistors are disposed in one first pixel group GSP1. The plurality of transistors may be N-type transistors or P-type transistors. In the N-type transistor, carriers are electrons so that electrons may flow from the source electrode to the drain electrode and currents may flow from the drain electrode to the source electrode. In the P-type transistor, carriers are holes so that holes may flow from the source electrode to the drain electrode and currents may flow from the source electrode to the drain electrode. For example, one of the plurality of transistors may be an N-type transistor and the other one of the plurality of transistors may be a P-type transistor.

Hereinafter, it is assumed that the plurality of transistors is N-type transistors, but is not limited thereto.

First, the plurality of first sub pixels SP1 which form one first pixel group GSP1 shares one PAM circuit PAM. The PAM circuit PAM includes a first switching transistor ST1, a first driving transistor DT1, a first sensing transistor SST1, and a first capacitor C1. The PAM circuit PAM may be connected to a first data line, a first scan line, a sensing line, a reference line, and a high potential power line VDD.

The first switching transistor ST1 is a transistor which is turned on by a first scan signal SCAN1 to transmit a first data voltage Data_PAM to the first driving transistor DT1. A gate electrode of the first switching transistor ST1 is connected to the first scan line, a drain electrode is connected to the first data line, and a source electrode is connected to a gate electrode of the first driving transistor DT1 which is a first node N1. The first switching transistor ST1 is turned on by the first scan signal SCAN1 from the first scan line to transmit the first data voltage Data_PAM of the first data line to the gate electrode of the first driving transistor DT1.

The first driving transistor DT1 is a transistor which controls an intensity of the driving current based on the first data voltage Data_PAM transmitted from the first switching transistor ST1. The gate electrode of the first driving transistor DT1 is connected to the first node N1, a drain electrode is connected to the high potential power line VDD, and a source electrode is connected to a second node N2. A driving current of the PAM circuit PAM may be output from the first driving transistor DT1 to each of the plurality of PWM circuits PWM.

The first sensing transistor SST1 is a transistor which senses a threshold voltage of the first driving transistor DT1 to compensate for a threshold voltage difference of the first driving transistor DT1. A gate electrode of the first sensing transistor SST1 is connected to the sensing line, a drain electrode is connected to the reference line, and a source electrode is connected to the second node N2. The first sensing transistor SST1 is turned on by a sensing signal Sense from the sensing line to connect the second node N2 which is the source electrode of the first driving transistor DT1 to the reference line.

Next, the first capacitor C1 maintains a potential difference between the gate electrode and the source electrode of the first driving transistor DT1 while the light emitting diode EL emits light to supply a constant driving current. The first capacitor C1 includes a plurality of capacitor electrodes and a first capacitor electrode is connected to the first node N1 and a second capacitor electrode is connected to the second node N2.

Next, each of the plurality of PWM circuits includes a second switching transistor ST2, a second driving transistor DT2, an emission control transistor ET, a second sensing transistor SST2, a third sensing transistor SST3, a second capacitor C2, and a third capacitor C3. The PWM circuit PWM may be connected to a second data line, a second scan line, a third scan line, the sensing line, the reference line, and a low potential power line VSS. Each of the plurality of PWM circuits PWM may be electrically connected to the second node N2 which is an output terminal of the PAM circuit PAM from which a driving current is output. That is, a plurality of PWM circuits PWM may be connected to one PAM circuit PAM in parallel.

First, the second switching transistor ST2 is a transistor which is turned on by a second scan signal SCAN2 to transmit a second data voltage Data_PWM to the second driving transistor DT2. A gate electrode of the second switching transistor ST2 is connected to the second scan line, a drain electrode is connected to the second data line, and a source electrode is connected to a gate electrode of the second driving transistor DT2 which is a third node N3. The second switching transistor ST2 is turned on by the second scan signal SCAN2 from the second scan line to transmit the second data voltage Data_PWM of the second data line to the gate electrode of the second driving transistor DT2.

The second driving transistor DT2 is a transistor which controls the driving current based on the second data voltage Data_PWM transmitted from the second switching transistor ST2. The gate electrode of the second driving transistor DT2 is connected to the third node N3, a drain electrode is connected to a fourth node N4, and a source electrode is connected to a fifth node N5. The second driving transistor DT2 is turned on to supply the driving current to the light emitting diode EL.

The second sensing transistor SST2 is a transistor which senses a threshold voltage of the second driving transistor DT2 to compensate for a threshold voltage difference of the second driving transistor DT2. A gate electrode of the second sensing transistor SST2 is connected to the sensing line, a drain electrode is connected to the reference line, and a source electrode is connected to the fifth node N5. The second sensing transistor SST2 is turned on by a sensing signal Sense from the sensing line to connect the fifth node N5 which is the source electrode of the second driving transistor DT2 to the reference line.

The emission control transistor ET is a transistor which blocks or connects a path through which the driving current flows between the PAM circuit PAM and the PWM circuit PWM. A gate electrode of the emission control transistor ET is connected to the emission control line, a drain electrode is connected to the second node N2 which is an output terminal of the PAM circuit PAM, and a source electrode is connected to the fourth node N4 which is the drain electrode of the second driving transistor DT2. The emission control transistor ET is turned on by the emission control signal EM from the emission control line to transmit the driving current from the PAM circuit PAM to the second driving transistor DT2.

At this time, the emission control transistor ET of each of the plurality of PWM circuits PWM may be connected to a different emission control line. Each of the plurality of PWM circuits PWM is connected to a different emission control line to independently control an emission period of the light emitting diode EL connected to each of the plurality of PWM circuits PWM. That is, the emission period of each of the plurality of PWM circuits PWM may be separately controlled. For example, one emission control transistor ET of emission control transistors ET of three PWM circuits PWM is connected to a first emission control line to be applied with a first emission control signal EM1. Another emission control transistor ET is connected to a second emission control line to be applied with a second emission control signal EM2. The other emission control transistor ET is connected to a third emission control line to be applied with a third emission control signal EM3. Accordingly, the first emission control signal EM1, the second emission control signal EM2, and the third emission control signal EM3 are applied to the first emission control line, the second emission control line, and the third emission control line, respectively. Therefore, turning-on and turning-off operations of the emission control transistors ET of the plurality of PWM circuits PWM may be independently controlled.

In the meantime, in the present disclosure, the PWM circuits PWM are referred to as a plurality of PWM circuits PWM without distinction. However, the plurality of PWM circuits PWM may be separately defined as a first PWM circuit connected to the first emission control line, a second PWM circuit connected to the second emission control line, and a third PWM circuit connected to the third emission control line, but is not limited thereto.

Next, the third sensing transistor SST3 is a transistor which supplies a voltage to the drain electrode of the second driving transistor DT2 when the threshold voltage of the second driving transistor DT2 is sensed. A gate electrode of the third sensing transistor SST3 is connected to the third scan line, a drain electrode is connected to the sensing voltage line, and a source electrode is connected to the drain electrode of the second driving transistor DT2 which is the fourth node N4. The third sensing transistor SST3 is turned on by a third scan signal SCAN3 of the third scan line and transmits a sensing voltage V_sense to the drain electrode of the second driving transistor DT2. A sensing current may flow from the drain electrode of the second driving transistor DT2 to the source electrode by the sensing voltage V_sense. The second sensing transistor SST2 transmits the sensing current to the reference line to sense the threshold voltage of the second driving transistor DT2. Specifically, the drain electrode of the first driving transistor DT1 is connected to the high potential power line VDD so that even though the third sensing transistor SST3 is not connected, the sensing current may flow. However, the drain electrode of the second driving transistors DT2 is not connected to a separate power line so that the sensing current may not flow in the second driving transistor, like the first driving transistor DT1. Therefore, only when the third sensing transistor SST3 is connected to the drain electrode of the second driving transistor DT2 to sense the threshold voltage, the sensing voltage V_sense is supplied to the drain electrode of the second driving transistor DT2 to flow the sensing current.

In the meantime, one third sensing transistor SST3 may be connected to the fourth node N4 of each of the plurality of PWM circuits PWM. That is, the plurality of PWM circuits PWM may share one third sensing transistor SST3. Therefore, the plurality of PWM circuits PWM includes one third sensing transistor SST3 to reduce the number of overall transistors and simply the design.

The second capacitor C2 is a capacitor which is connected between a sweep line and the third node N3 to transmit a sweep signal Sweep of the sweep line to the third node N3. The second capacitor C2 includes a plurality of capacitor electrodes and a first capacitor electrode is connected to the sweep line and a second capacitor electrode is connected to the third node N3 which is the gate electrode of the second driving transistor DT2. The sweep signal Sweep which is applied to the sweep line linearly changes. During the emission period, when the sweep signal Sweep is applied to one end of the second capacitor C2, a coupling voltage may be generated in the gate electrode of the second driving transistor DT2 which is floated. Accordingly, the voltage of the gate electrode of the second driving transistor DT2 is coupled to the sweep signal Sweep to be decreased or increased and the second driving transistor DT2 may be turned off or turned on.

The third capacitor C3 maintains a potential difference between the gate electrode and the source electrode of the second driving transistor DT2 while the light emitting diode EL emits light to supply a constant driving current. The third capacitor C3 includes a plurality of capacitor electrodes and a first capacitor electrode is connected to the third node N3 and a second capacitor electrode is connected to the fifth node N5.

Next, the light emitting diode EL is connected to the fifth node N5 of each of the plurality of PWM circuits PWM. The light emitting diode EL includes an anode and a cathode. The anode of the light emitting diode EL is connected to the fifth node N5 and the cathode is connected to the low potential power line VSS to which a low potential power voltage is supplied. Accordingly, the light emitting diode EL may emit light based on a driving current which is transmitted from the second driving transistor DT2 to the anode.

In the meantime, a micro-LED which has excellent luminous efficiency may be mainly used as the light emitting diode EL. In the micro-LED, the color coordinate is distorted in a low current band. When a driving current in the low current band is supplied to the light emitting diode EL according to a characteristic of an image to be displayed, the color coordinate of the light emitting diode EL is distorted to degrade an image display quality.

Accordingly, in the display device 100 according to the exemplary embodiment of the present disclosure, the first data voltage Data_PAM having a constant value is applied to the PAM circuit PAM. Therefore, the color coordinate distortion of the light emitting diode EL which is generated in the low current band may be suppressed and the light emitting diode EL may be stably driven. The PAM circuit is a circuit configured to adjust an amplitude of the driving current, that is, an intensity of the driving current. If only a first data voltage Data_PAM with a specific value is applied to the PAM circuit PAM, the PAM circuit PAM may generate a driving current which always has a constant intensity and output the driving current to the PWM circuit PWM. That is, the PAM circuit PAM may generate and output a driving current which is always constant regardless of the gray scale level of the displayed image. At this time, a first data voltage Data_PAM may be set to fix a driving current which is primarily generated in the PAM circuit PAM as a current excluding the low current band. Accordingly, the first data voltage Data_PAM is fixed to a specific value to supply a driving current which has always a constant intensity to the light emitting diode EL so that the color coordinate distortion may not occur.

At this time, the first data voltage Data_PAM applied to the PAM circuit may be determined according to an efficiency of the light emitting diode EL of a pixel group in which the PAM circuit PAM is disposed. That is, the first data voltage Data_PAM has a constant value that is dependent on the color of the light emitting diodes EL of the pixel group. A different type of light emitting diode EL may be disposed in each of the first sub pixel SP1, the second sub pixel SP2, and the third sub pixel SP3. For example, in the first sub pixel SP1 which is a red sub pixel SP, a red light emitting diode which emits red light may be disposed. In the second sub pixel SP2 which is a green sub pixel SP, a green light emitting diode which emits green light may be disposed. In the third sub pixel SP3 which is a blue sub pixel SP, a blue light emitting diode which emits blue light may be disposed. The red light emitting diode, the green light emitting diode, and the blue light emitting diode which emit different colors of light have different efficiencies so that even though the driving current with the same intensity is supplied, the luminance of light emitted from the red light emitting diode, the green light emitting diode, and the blue light emitting diode may be different. Therefore, the first data voltage Data_PAM supplied to the PAM circuit PAM of each of the first pixel group GSP1, the second pixel group GSP2, and the third pixel group GSP3 may be determined in consideration of the characteristic of the light emitting diode EL of each pixel group.

In the meantime, when a PAM circuit PAM which generates a driving current always having a constant intensity is used, it may be difficult to express various gray scale levels. Accordingly, in the display device 100 according to the exemplary embodiment of the present disclosure, a PWM circuit PWM which controls a pulse width of the driving current is used together to display images with various gray scale levels. The PWM circuit PWM is connected between the PAM circuit PAM and the light emitting diode EL to adjust a duty ratio or a duration that the driving current generated in the PAM circuit PAM is supplied to the light emitting diode EL. The PWM circuit PWM adjusts the duty ratio or the duration that the driving current is supplied to the light emitting diode EL to display images with various gray scale levels. At this time, a second data voltage Data_PWM applied to the PWM circuit PWM may vary depending on the gray scale level, unlike the first data voltage Data_PAM. For example, a value of the second data voltage Data_PWM which is output for the low-gray scale image and a value of the second data voltage Data_PWM which is output for a high-gray scale image may be different. The PWM circuit PWM may adjust the emission time of the light emitting diode EL based on the second data voltage Data_PWM to be different. Thus, the magnitude of the second data voltage Data_PWM is image dependent. For example, the second data voltage Data_PWM may have a first magnitude that corresponds to a first image at a first time such that the driving current is supplied to the second driving transistor DT2 for a first duration and the second data voltage Data_PWM has a second magnitude that corresponds to a second image at a second time such that the driving current is supplied to the second driving transistor DT2 for a second duration that is different from the first duration. Accordingly, the display device 100 according to the exemplary embodiment of the present disclosure uses the PAM circuit PAM and the PWM circuit PWM together to stably drive the light emitting diode EL and improve a display quality of the image while suppressing the color coordinate distortion in the low current band. The PAM circuit PAM generates a driving current with a constant intensity in a band other than the low current band and the PWM circuit PWM adjusts the pulse width of the driving current generated in the PAM circuit to supply the driving current to the light emitting diode EL to express the gray scale level.

Hereinafter, a driving process of the sub pixel SP of the display device 100 according to the exemplary embodiment of the present disclosure will be described in more detail with reference to FIGS. 4A to 5C.

Figure 4A:
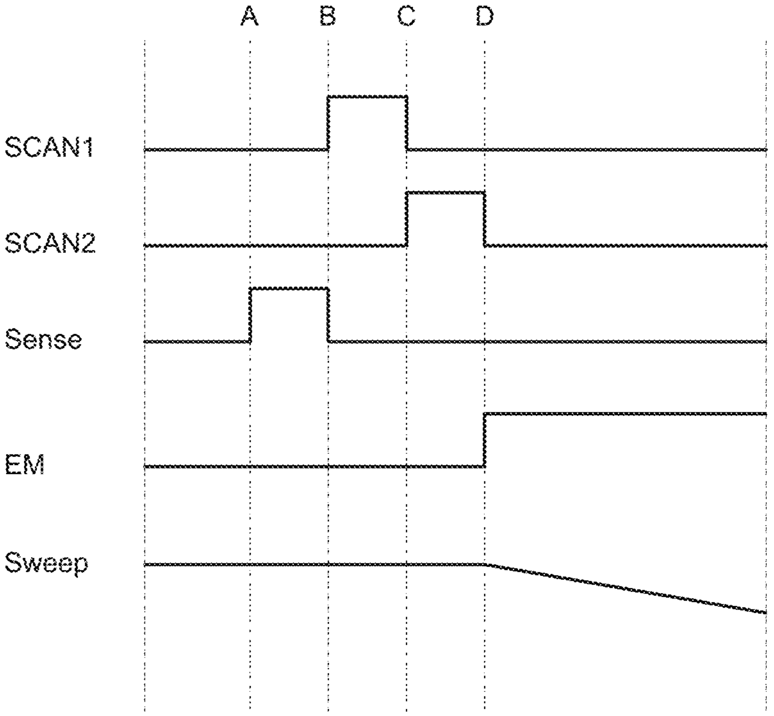
FIGS. 4A to 4C are driving timing diagrams of a sub pixel of a display device according to an exemplary embodiment of the present disclosure.
Figure 4B:
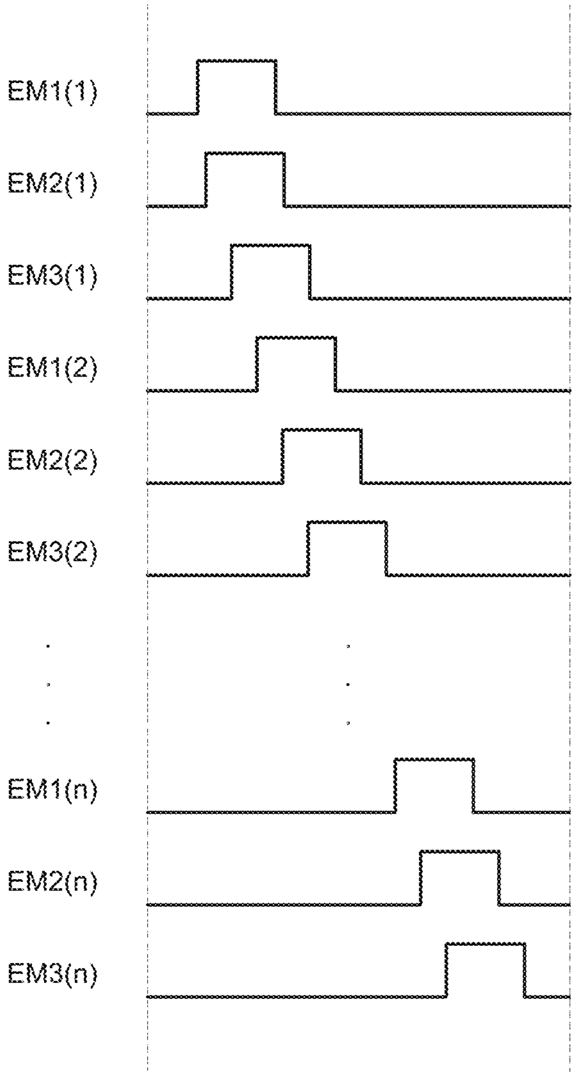
Figure 4C:
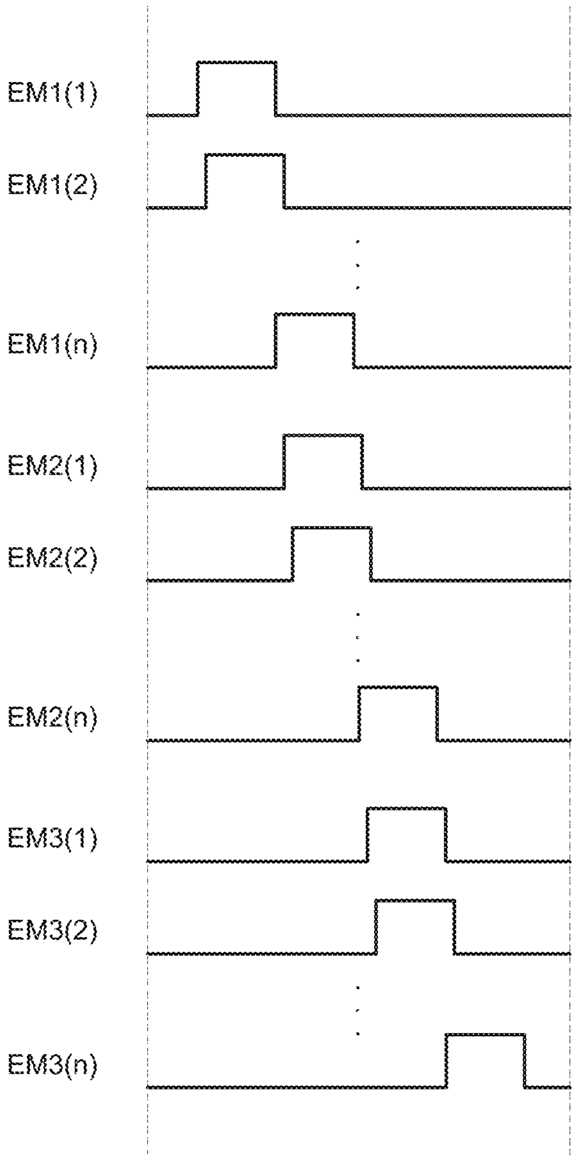
Figure 5A:
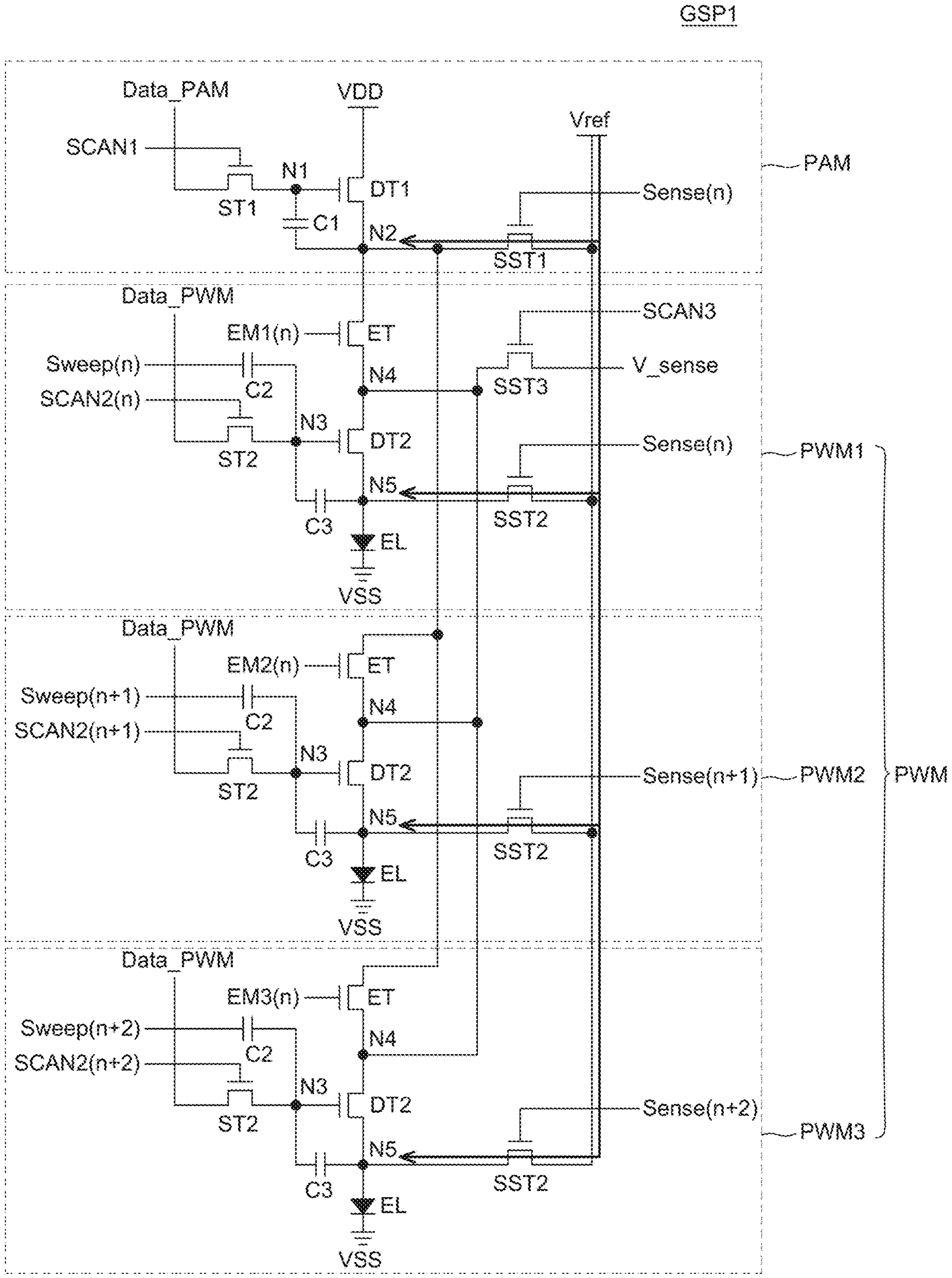
FIG. 5A is a circuit diagram of a first pixel group of a display device during an initialization period according to an exemplary embodiment of the present disclosure.
Figure 5B:
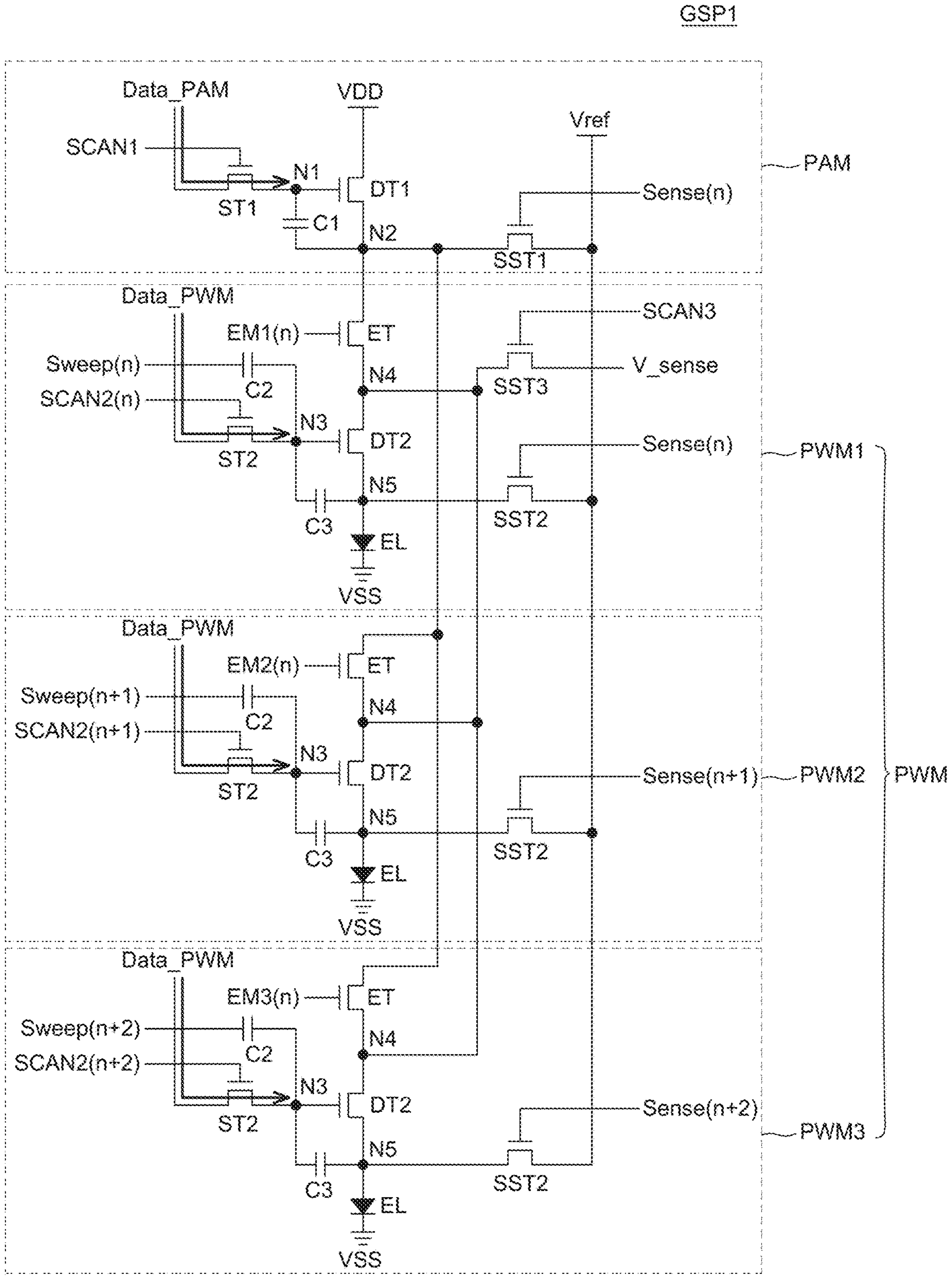
FIG. 5B is a circuit diagram of a first pixel group of a display device during a data writing period according to an exemplary embodiment of the present disclosure.
Figure 5C:
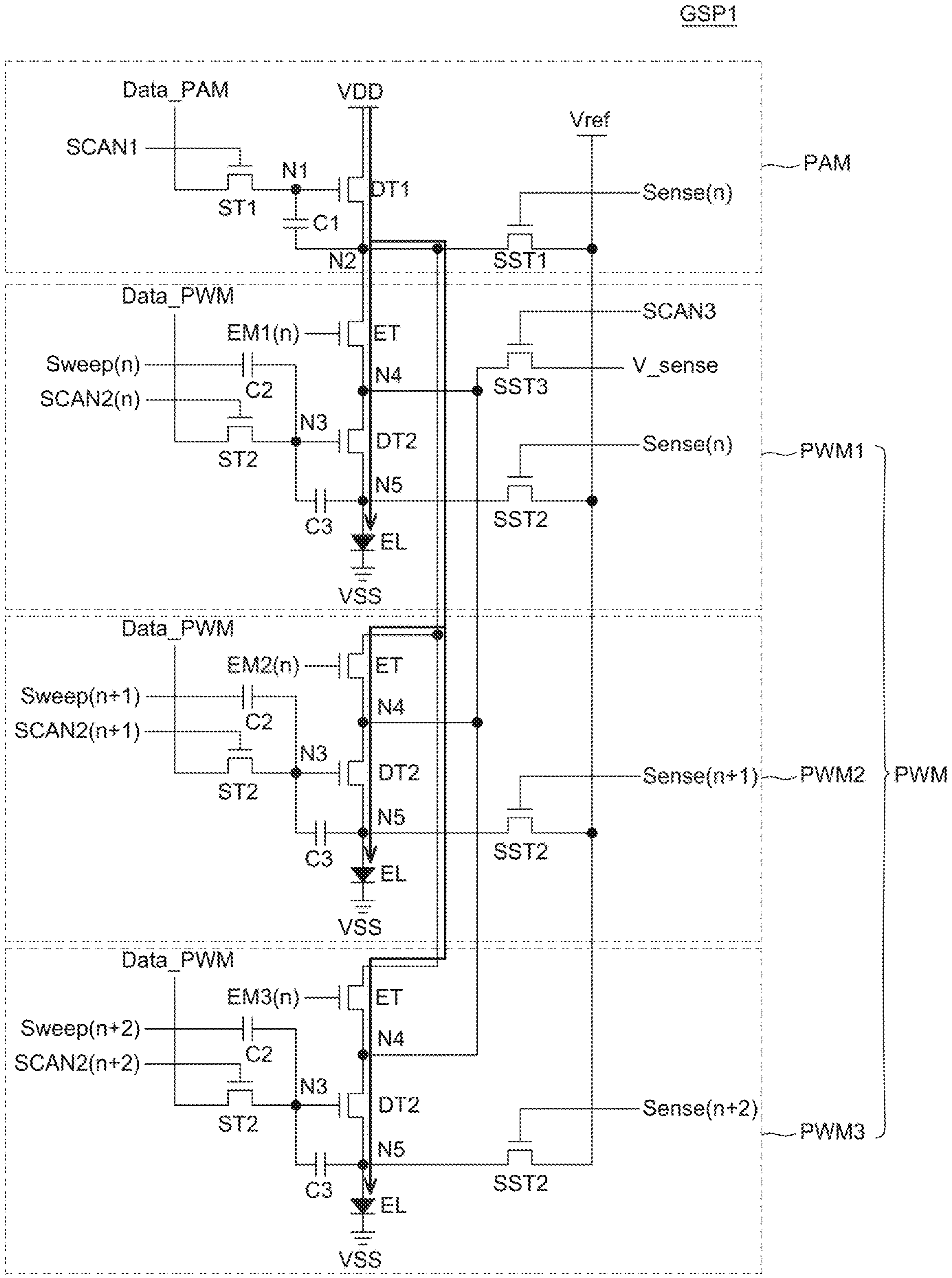
FIG. 5C is a circuit diagram of a first pixel group of a display device during an emission period according to an exemplary embodiment of the present disclosure.

FIGS. 4A to 4C are driving timing diagrams of a sub pixel of a display device according to an exemplary embodiment of the present disclosure. FIG. 5A is a circuit diagram of a first pixel group of a display device during an initialization period according to an exemplary embodiment of the present disclosure. FIG. 5B is a circuit diagram of a first pixel group of a display device during a data writing period according to an exemplary embodiment of the present disclosure. FIG. 5C is a circuit diagram of a first pixel group of a display device during an emission period according to an exemplary embodiment of the present disclosure.

Referring to FIG. 4A, the plurality of sub pixels SP of the display device 100 according to the exemplary embodiment of the present disclosure may be driven in the order of the initialization period, the data writing period, and the emission period. A period between a time A and a time B is the initialization period, a period between a time B and a time D is the data writing period, and the emission period is after the time D.

In the meantime, each of the plurality of PWM circuits is connected to different sweep line, second scan line, and sensing line so that the driving timings of the initialization period and the data writing period may be independently controlled. For example, the first PWM circuit is connected to n-th lines, among the plurality of lines to be applied with an n-th sweep signal Sweep (n), an n-th second scan signal SCAN2 (*n*), and an n-th sensing signal Sense (n). The second PWM circuit is connected to n+1-th lines, among the plurality of lines to be applied with an n+1-th sweep signal Sweep (n+1), an n+1-th second scan signal SCAN2 (n+1), and an n+1-th sensing signal Sense (n+1). The third PWM circuit is connected to n+2-th lines, among the plurality of lines to be applied with an n+2-th sweep signal Sweep (n+2), an n+2-th second scan signal SCAN2 (n+2), and an n+2-th sensing signal Sense (n+2). At this time, the driving timings of the initialization period and the data writing period of each of the first PWM circuit, the second PWM circuit, and the third PWM circuit may be determined according to a timing when a signal is output to each of the n-th line, the n+1-th line, and the n+2-th line.

In FIG. 4A, for the convenience of description, the description will be made as follows: An n-th sweep signal Sweep (n), an n+1-th sweep signal Sweep (n+1), and an n+2-th sweep signal Sweep (n+2) are illustrated to be unified as one sweep signal Sweep. An n-th second scan signal SCAN2 (*n*), an n+1-th second scan signal SCAN2 (n+1), and an n+2-th second scan signal SCAN2 (n+2) are illustrated to be unified as one second scan signal SCAN2. An n-th sensing signal Sense (n), an n+1-th sensing signal Sense (n+1), and an n+2-th sensing signal Sense (n+2) are illustrated to be unified as one sensing signal Sense. Further, all the plurality of PWM circuits PWM is applied with the second data voltage Data_PWM at the same timing. However, each of the plurality of PWM circuits PWM may be applied with a second data voltage Data_PWM at different timings, but it is not limited thereto.

Referring to FIGS. 4A and 5A together, during the initialization period between the times A and B, a high level of sensing signal Sense is output to the sensing line. Therefore, the first sensing transistor SST1 and the second sensing transistor SST2 connected to the sensing line through the gate electrodes are turned on to apply the reference voltage Vref to the second node N2 and the fourth node N4. Accordingly, the source electrode of the first driving transistor DT1 of the PAM circuit PAM and the source electrode of the second driving transistor DT2 of the PWM circuit PWM may be initialized to the reference voltage Vref.

Referring to FIGS. 4A and 5B together, during the data writing period between the times B and D, a high level of first scan signal SCAN1 is output to the first scan line and a high level of second scan signal SCAN2 is output to the second scan line. The first switching transistor ST1 of the PAM circuit PAM is turned on by the first scan signal SCAN1 to transmit the first data voltage Data_PAM to the first node N1. The second switching transistor ST2 of the PWM circuit PWM is turned on by the second scan signal SCAN2 to transmit the second data voltage Data_PWM to the third node N3.

In the meantime, in the present disclosure, it is described that the first scan signal SCAN1 and the second scan signal SCAN2 are output in different periods to configure periods where the data voltages are written in the PAM circuit PAM and the PWM circuit PWM to be different. However, the data voltages may be simultaneously written in the PAM circuit PAM and the PWM circuit PWM, but it is not limited thereto.

Next, referring to FIGS. 4A and 5C, during the emission period after the time D, a high level of emission control signal EM is output to the emission control line. Accordingly, the driving current from the PAM circuit PAM may flow to the second driving transistor DT2 of the PWM circuit PWM through the turned-on emission control transistor ET. The second driving transistor DT2 may transmit the driving current to the light emitting diode EL according to the sweep signal Sweep applied to the gate electrode. Finally, the light emitting diode EL may be supplied with the driving current from the first driving transistor DT1 and the second driving transistor DT2 to emit light.

The second driving transistor DT2 may determine a length of a period when the light emitting diode EL actually emits light within a period when the emission control transistor ET is turned on. The actual emission period of the light emitting diode EL may correspond to a period when the second driving transistor DT2 is turned on in the period when the emission control transistor ET is turned on. For example, even though the emission control transistor ET is turned on, the second driving transistor DT2 may be turned off to control the light emitting diode EL so as not to emit light. As another example, only in a partial period of the period when the emission control transistor ET is turned on, the second driving transistor DT2 is turned on to control the light emitting diode EL so as to emit light only during a partial period.

In the meantime, the emission signal may be output to the emission control line in various orders. For example, referring to FIG. 4B, a plurality of pixel groups is disposed to form a plurality of rows and an emission control signal EM including a first emission control signal EM1, a second emission control signal EM2, and a third emission control signal EM3 may be sequentially applied to the pixel groups, starting from a pixel group in an uppermost row. The first emission control signal EM1, the second emission control signal EM2, and the third emission control signal EM3 may be sequentially applied to the first emission control line, the second emission control line, and the third emission control line connected to pixel groups in a first row. The first emission control signal EM1, the second emission control signal EM2, and the third emission control signal EM3 may be sequentially applied to the first emission control line, the second emission control line, and the third emission control line connected to pixel groups in a second row. Finally, the first emission control signal EM1, the second emission control signal EM2, and the third emission control signal EM3 may be applied to the first emission control line, the second emission control line, and the third emission control line connected to pixel groups in a lowermost row. Accordingly, the plurality of sub pixels SP which is disposed to form a plurality of rows, may emit light sequentially in the order from a sub pixel SP in the uppermost row to a sub pixel SP in the lowermost row.

As another example, referring to FIG. 4C, the first emission control signal EM1 may be applied first to the first emission control line of each of the plurality of pixel groups. In this case, among three sub pixels SP included in each of the plurality of pixel groups, only a sub pixel SP connected to the first emission control line may emit light first. Next, the second emission control signal EM2 may be applied to the second emission control line of each of the plurality of pixel groups. Therefore, a sub pixel SP connected to the second emission control line may emit light. Finally, the third emission control signal EM3 may be connected to the third emission control line of each of the plurality of pixel groups. Accordingly, among three sub pixels SP included in each of the plurality of pixel groups, a sub pixel SP connected to the third emission control line may emit light last.

Accordingly, in the display device 100 according to the exemplary embodiment of the present disclosure, the plurality of sub pixels SP shares one PAM circuit PAM to reduce the number of transistors. That is, one PWM circuit PWM is disposed in each of the plurality of sub pixels SP and the plurality of PWM circuits PWM is connected to an output terminal of the one PAM circuit PAM in parallel to drive the light emitting diode EL. Accordingly, a PAM circuit PAM which is individually disposed in each of the plurality of sub pixels SP is deleted to reduce the number of overall transistors. Therefore, a design area occupied by one sub pixel SP may be reduced and a larger number of sub pixels SP may be formed in the same area. Accordingly, a design area of each of the plurality of sub pixels SP is reduced to implement a display device 100 with a high resolution.

Hereinafter, an external compensation process of a PAM circuit PAM and a PWM circuit PWM will be described with reference to FIGS. 6 to 9.

Figure 6:
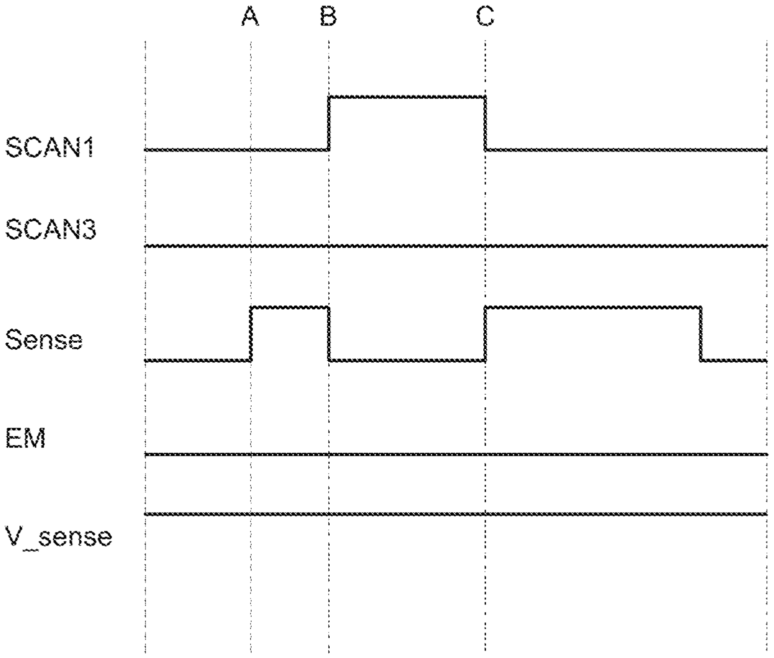
FIG. 6 is a timing diagram of external compensation of a PAM circuit of a display device according to an exemplary embodiment of the present disclosure.
Figure 7:
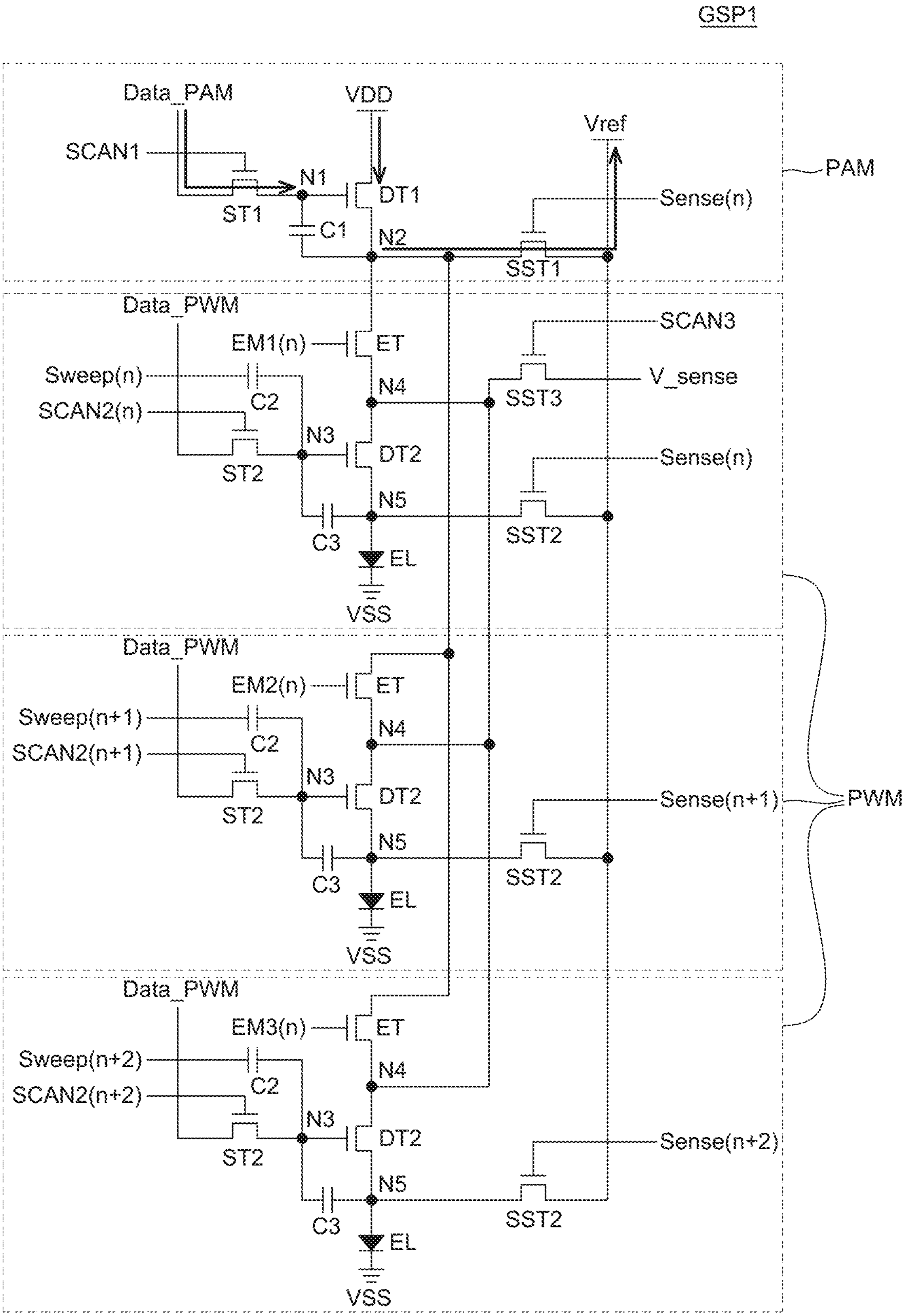
FIG. 7 is a circuit diagram of a first pixel group of a display device during an external compensation period of a PAM circuit according to an exemplary embodiment of the present disclosure.
Figure 8:
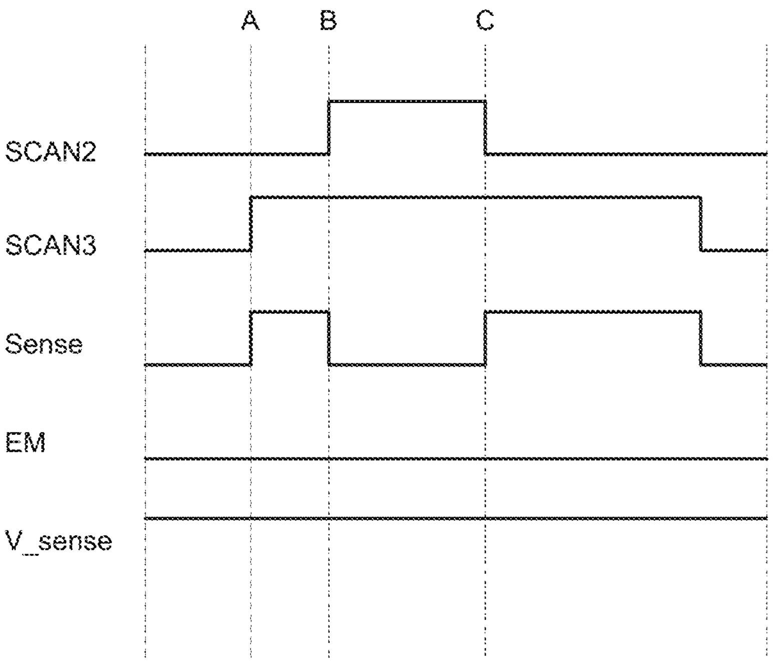
FIG. 8 is a timing diagram of external compensation of a PWM circuit of a display device according to an exemplary embodiment of the present disclosure.
Figure 9:
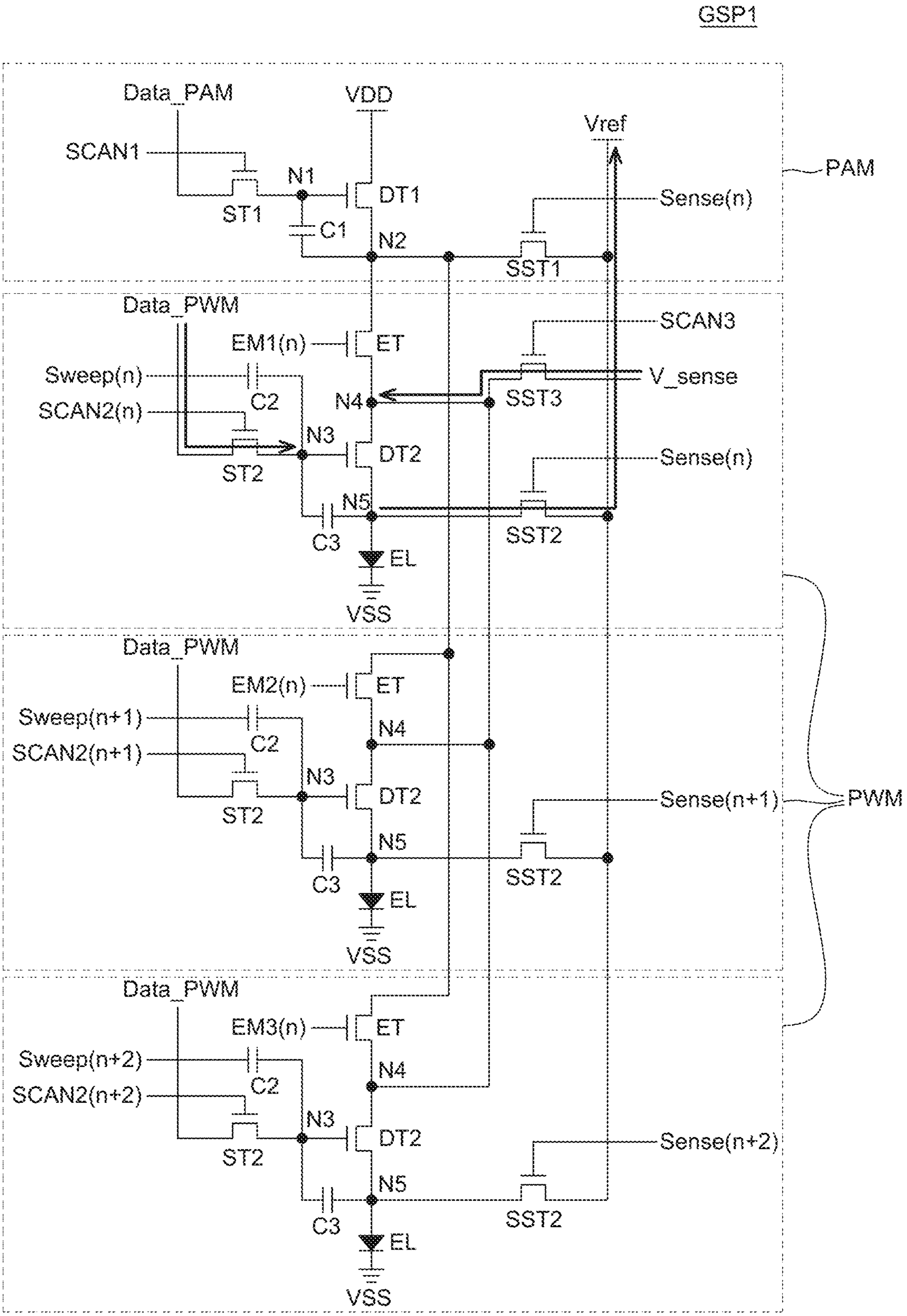
FIG. 9 is a circuit diagram of a first pixel group of a display device during an external compensation period of a PWM circuit according to an exemplary embodiment of the present disclosure.

FIG. 6 is a timing diagram of external compensation of a PAM circuit of a display device according to an exemplary embodiment of the present disclosure. FIG. 7 is a circuit diagram of a first pixel group of a display device during an external compensation period of a PAM circuit according to an exemplary embodiment of the present disclosure. FIG. 8 is a timing diagram of external compensation of a PWM circuit of a display device according to an exemplary embodiment of the present disclosure. FIG. 9 is a circuit diagram of a first pixel group of a display device during an external compensation period of a PWM circuit according to an exemplary embodiment of the present disclosure.

In the display device 100 according to the exemplary embodiment of the present disclosure, threshold voltages of a first driving transistor DT1 of a PAM circuit PAM and a second driving transistor DT2 of a PWM circuit PWM may be sensed and compensated by an external compensation method using a source follower. The threshold voltage may be sensed and compensated in a state when the display device 100 is turned off and the threshold voltage of the first driving transistor DT1 of the PAM circuit PAM and the threshold voltage of the second driving transistor DT2 of the PWM circuit PWM may be sensed in different periods.

First, referring to FIGS. 6 and 7, the threshold voltage of the first driving transistor DT1 of the PAM circuit PAM may be sensed in the order of an initialization period, a source following period, and a sampling period. A period between a time A and a time B is the initialization period, a period between a time B and a time C is the source following period, and the sampling period is after the time C.

During the initialization period between the times A and B, a voltage of the source electrode of the first driving transistor DT1 of the PAM circuit PAM may be initialized. At the time A, a high level of sensing signal Sense is applied to the sensing line to turn on the first sensing transistor SST1 and connect the reference line and the second node N2 which is the source electrode of the first driving transistor DT1. Accordingly, at the time A, the voltage of the source electrode of the first driving transistor DT1 may be initialized.

Next, during the source following period between the times B and C, the sensing current may flow while holding the voltage of the gate electrode of the first driving transistor DT1 of the PAM circuit PAM. At the time B, a high level of first scan signal SCAN1 is output to the first scan line to apply a sensing data voltage to the gate electrode of the first driving transistor DT1. The sensing current may flow from the drain electrode to the source electrode of the first driving transistor DT1 and a voltage of the source electrode of the first driving transistor DT1 may gradually increase. The sensing current which flows through the first driving transistor DT1 may flow until a potential difference between the source electrode and the gate electrode of the first driving transistor DT1 is equal to a threshold voltage.

Finally, during the sampling period after the time C, a high level of sensing signal Sense is output to the sensing line to turn on the first sensing transistor SST1. When the sensing current does not flow, an analog to digital converter may detect a voltage of the source electrode of the first driving transistor DT1 through the turned-on first sensing transistor SST1 and the reference line. Accordingly, the threshold voltage of the first driving transistor DT1 may be detected from the sensing data voltage applied to the gate electrode of the first driving transistor DT1 and the voltage of the source electrode of the first driving transistor DT1. Accordingly, the data driver DD compensates for the first data voltage Data_PAM based on the threshold voltage of the first driving transistor DT1 to output the compensated voltage to the sub pixel SP.

Next, referring to FIGS. 8 and 9, the threshold voltage of the second driving transistor DT2 of the PWM circuit PWM may be sensed in the order of an initialization period, a source following period, and a sampling period. A period between a time A and a time B is the initialization period, a period between a time B and a time C is the source following period, and the sampling period is after the time C.

During the initialization period between the times A and B, a voltage of the source electrode of the second driving transistor DT2 of the PWM circuit PWM may be initialized. At the time A, a high level of sensing signal Sense is applied to the sensing line to turn on the second sensing transistor SST2 and connect the reference line and the fifth node N5 which is the source electrode of the second driving transistor DT2. Accordingly, at the time A, the voltage of the source electrode of the second driving transistor DT2 may be initialized.

Next, during the source following period between the times B and C, the voltage of the gate electrode of the second driving transistor DT2 of the PWM circuit PWM is held for the sensing data voltage and the sensing voltage V_sense is applied to the drain electrode to flow a sensing current in the second driving transistor DT2. At the time B, a high level of second scan signal SCAN2 is output to the second scan line to apply a sensing data voltage to the gate electrode of the second driving transistor DT2. A high level of third scan signal SCAN3 is output to the third scan line to turn on the third sensing transistor SST3. During the entire period when the threshold voltage is sensed, the third scan line may continuously output the high level of third scan signal SCAN3 and the sensing voltage V_sense may be applied to the fourth node N4 which is the drain electrode of the second driving transistor DT2. Accordingly, the sensing current may flow from the drain electrode to the source electrode of the second driving transistor DT2 and a voltage of the source electrode of the second driving transistor DT2 may gradually increase. The sensing current which flows through the second driving transistor DT2 may flow until a potential difference between the source electrode and the gate electrode of the second driving transistor DT2 is equal to a threshold voltage.

Finally, during the sampling period after the time C, a high level of sensing signal Sense is output to the sensing line to turn on the second sensing transistor SST2. The analog to digital converter may detect a voltage of the source electrode of the second driving transistor DT2 through the turned-on second sensing transistor SST2 and the reference line. Accordingly, the threshold voltage of the second driving transistor DT2 may be detected from the sensing data voltage applied to the gate electrode of the second driving transistor DT2 and the voltage of the source electrode of the second driving transistor DT2. Accordingly, the data driver DD compensates for the second data voltage Data_PWM based on the threshold voltage of the second driving transistor DT2 to output the compensated voltage to the sub pixel SP.

Accordingly, in the display device 100 according to the exemplary embodiment of the present disclosure, the threshold voltage of the first driving transistor DT1 of the PAM circuit PAM may be sensed using the first sensing transistor SST1. Further, the threshold voltage of the second driving transistor DT2 of the PWM circuit PWM may be sensed using the second sensing transistor SST2 and the third sensing transistor SST3. Therefore, the threshold voltage difference between the plurality of sub pixels SP is compensated to apply the first data voltage Data_PAM and the second data voltage Data_PWM to improve the luminance uniformity and improve the display quality of the image.

Figure 10:
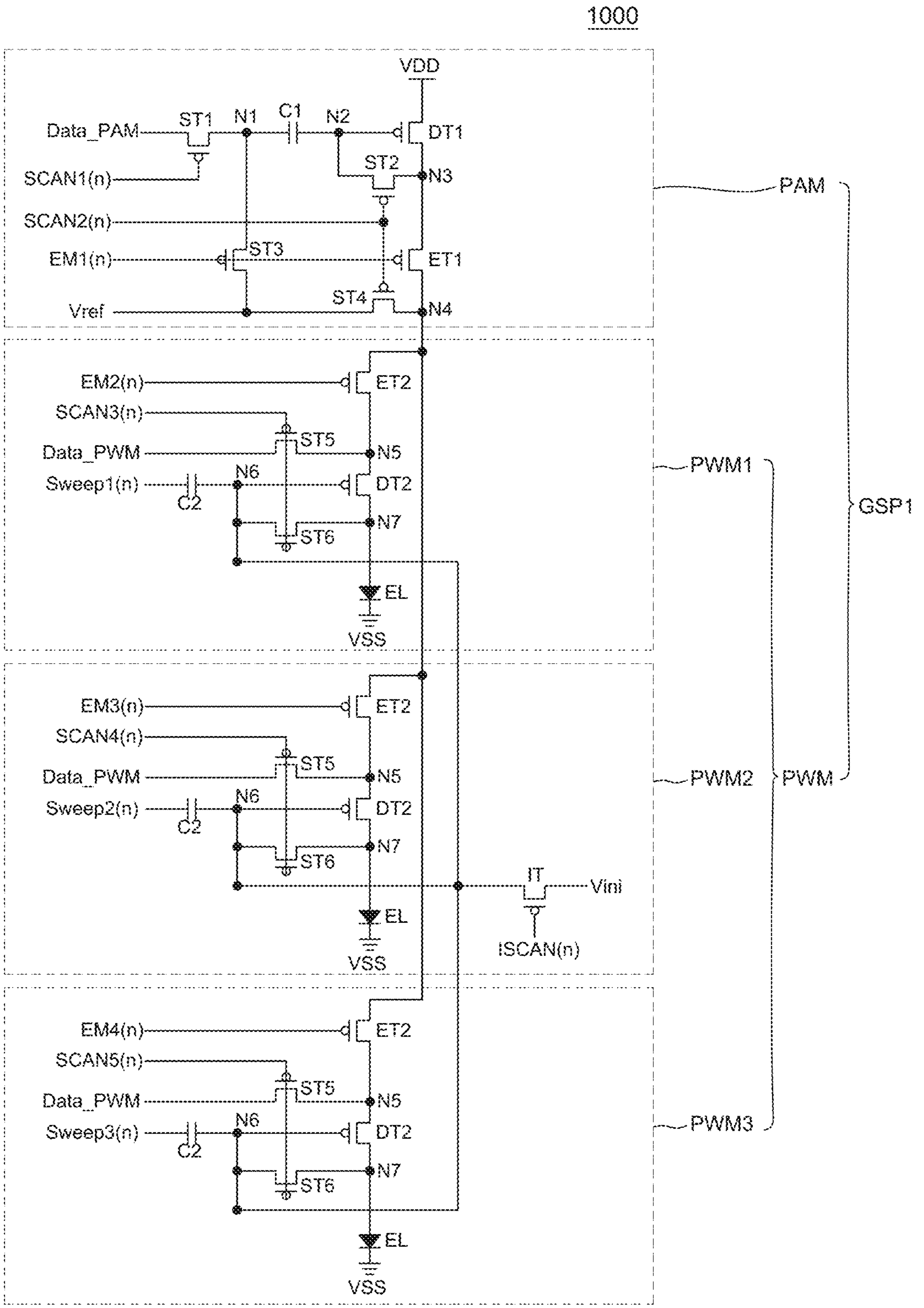
FIG. 10 is a circuit diagram of a first pixel group of a display device according to another exemplary embodiment of the present disclosure.

FIG. 10 is a circuit diagram of a first pixel group of a display device according to another exemplary embodiment of the present disclosure. A display device 1000 of FIG. 10 includes a circuit which senses and compensates for threshold voltages of the first driving transistor DT1 of the PAM circuit PAM and the second driving transistor DT2 of the PWM circuit PWM by an internal compensation method. This is different from the circuit configuration of the sub pixel SP of the display device 100 of FIGS. 1 to 9. However, another configuration is substantially the same so that a redundant description will be omitted. Even though in FIG. 10, only a circuit diagram of a first pixel group GSP1 among the plurality of pixel groups is illustrated, circuits of the second pixel group GSP2 and the third pixel group GSP3 are the substantially same as the circuit of the first pixel group GSP1.

Referring to FIG. 10, a plurality of transistors are disposed in one first pixel group GSP1. The plurality of transistors may be N-type transistors in which a current flows from drain electrodes to source electrodes or P-type transistors in which a current flows from source electrodes to drain electrodes. Hereinafter, it is assumed that the plurality of transistors is P-type transistors, but is not limited thereto.

The plurality of first sub pixels SP1 which form one first pixel group GSP1 shares one PAM circuit PAM. The PAM circuit PAM includes a first switching transistor ST1, a second switching transistor ST2, a third switching transistor ST3, a fourth switching transistor ST4, a first driving transistor DT1, a first emission control transistor ET1, and a first capacitor C1. The PAM circuit PAM is connected to a first data line, a first scan line, a second scan line, a first emission control line, a reference line, and a high potential power line VDD.

The first switching transistor ST1 is a transistor which is turned on by a first scan signal SCAN1 to transmit a first data voltage Data_PAM to an internal configuration of the PAM circuit PAM. A gate electrode of the first switching transistor ST1 is connected to the first scan line, a source electrode is connected to the first data line, and a drain electrode is connected to the first capacitor C1 at a first node N1. The first switching transistor ST1 is turned on by the first scan signal SCAN1 from the first scan line to transmit the first data voltage Data_PAM of the first data line to the first capacitor C1.

The second switching transistor ST2 is a transistor which samples the threshold voltage of the first driving transistor DT1 to compensate for a threshold voltage difference between the first driving transistors DT1 of the plurality of sub pixels SP. A gate electrode of the second switching transistor ST2 is connected to the second scan line and a source electrode and a drain electrode are connected to the second node N2 and the third node N3, respectively. The second switching transistor ST2 shorts the gate electrode and the drain electrode of the first driving transistor DT1 and may form diode connection of the first driving transistor DT1. In the diode connection, the gate electrode and the drain electrode are shorted so that the transistor operates as a diode.

The third switching transistor ST3 is a transistor for transmitting the reference voltage Vref to the first node N1. A gate electrode of the third switching transistor ST3 is connected to the first emission control line, a source electrode is connected to the reference line, and a drain electrode is connected to the first node N1. The third switching transistor ST3 may transmit the reference voltage Vref to the first node N1 while applying a low level of first emission control signal EM1 from the first emission control line and the first node N1 may be initialized to the reference voltage Vref.

The fourth switching transistor ST4 is a transistor for transmitting the reference voltage Vref to the fourth node N4. A gate electrode of the fourth switching transistor ST4 is connected to the second scan line, a source electrode is connected to the reference line, and a drain electrode is connected to the fourth node N4. The fourth switching transistor ST4 is turned on by the second scan signal SCAN2 to transmit the reference voltage Vref to the fourth node N4. The reference voltage Vref of the fourth node N4 may be transmitted to the third node N3 which is the drain electrode of the first driving transistor DT1 through the first emission control transistor ET1 which is turned on together with the fourth switching transistor ST4. The voltages of the gate electrode and the drain electrode of the first driving transistor DT1 may be initialized using the third switching transistor ST3 and the fourth switching transistor ST4, which will be described in more detail with reference to FIGS. 12A to 12F.

The first driving transistor DT1 is a transistor which controls an intensity of the driving current based on the first data voltage Data_PAM. The gate electrode of the first driving transistor DT1 is connected to the second node N2, the source electrode is connected to the high potential power line VDD, and the drain electrode is connected to the third node N3. A driving current of the PAM circuit PAM may be output from the first driving transistor DT1 to each of the plurality of PWM circuits PWM.

The first emission control transistor ET1 is a transistor for transmitting the driving current from the first driving transistor DT1 to each of the plurality of PWM circuits PWM. A gate electrode of the first emission control transistor ET1 is connected to the first emission control line, a source electrode is connected to the third node N3, and a drain electrode is connected to the fourth node N4. The first emission control transistor is turned on to transmit the reference voltage Vref from the fourth switching transistor ST4 to the drain electrode of the first driving transistor DT1 or transmit the driving current from the first driving transistor DT1 to each of the plurality of PWM circuits PWM.

The first capacitor C1 maintains a potential difference between the gate electrode and the drain electrode of the first driving transistor DT1 while the light emitting diode EL emits light to supply a constant driving current. The first capacitor C1 includes a plurality of capacitor electrodes and a first capacitor electrode is connected to the first node N1 and the a second capacitor electrode is connected to the second node N2.

Next, the plurality of first sub pixels SP1 includes a plurality of PWM circuits PWM. Each of the plurality of PWM circuits PWM includes a fifth switching transistor ST5, a sixth switching transistor ST6, a second driving transistor DT2, a second emission control transistor ET2, and a second capacitor C2. The plurality of PWM circuits PWM may share and include one initialization transistor IT. The PWM circuit PWM is connected to a second data line, a third scan line, a second emission control line, a sweep line, an initialization line, and a low potential power line VSS. Each of the plurality of PWM circuits PWM may be electrically connected to the fourth node N4 which is an output terminal of the PAM circuit PAM from which the driving current is output. That is, a plurality of PWM circuits PWM may be connected to one PAM circuit PAM in parallel.

The fifth switching transistor ST5 is a transistor which is turned on by a third scan signal SCAN3 to transmit a second data voltage Data_PWM to the second driving transistor DT2. A gate electrode of the fifth switching transistor ST5 is connected to the third scan line, a source electrode is connected to the second data line, and a drain electrode is connected to the fifth node N5. The fifth switching transistor ST5 is turned on by the third scan signal SCAN3 from the third scan line to transmit the second data voltage Data_PWM of the second data line to the fifth node N5 which is the source electrode of the second driving transistor DT2.

The sixth switching transistor ST6 is a transistor which samples the threshold voltage of the second driving transistor DT2 to compensate for a threshold voltage difference of the second driving transistors DT2 of the plurality of sub pixels SP. A gate electrode of the sixth transistor ST6 is connected to the third scan line and a source electrode and a drain electrode are connected to a sixth node N6 and a seventh node N7. The sixth switching transistor ST6 shorts the gate electrode and the drain electrode of the second driving transistor DT2 and form diode connection of the second driving transistor DT2.

The second driving transistor DT2 is a transistor which controls the driving current based on the second data voltage Data_PWM. The gate electrode of the second driving transistor DT2 is connected to the sixth node N6, the source electrode is connected to the fifth node N5, and the drain electrode is connected to the seventh node N7. The second driving transistor DT2 is turned on to supply the driving current to the light emitting diode EL.

The second emission control transistor ET2 is a transistor which blocks or connects a path through which the driving current flows between the PAM circuit PAM and the PWM circuit PWM. A gate electrode of the second emission control transistor ET2 is connected to any one of the second emission control line, the third emission control line, and the fourth emission control line and a source electrode is connected to the fourth node N4 which is an output terminal of the PAM circuit PAM. Further, a drain electrode is connected to the fifth node N5 which is the source electrode of the second driving transistor DT2. The second emission control transistor ET2 is turned on by a second emission control signal EM2 from the second emission control line to transmit the driving current from the PAM circuit PAM to the second driving transistor DT2.

The second emission control transistor ET2 of each of the plurality of PWM circuits PWM may be connected to a different emission control line. Each of the plurality of PWM circuits PWM is connected to a different emission control line to independently control an emission period of the light emitting diode EL connected to each of the plurality of PWM circuits PWM. That is, the emission period of each of the plurality of PWM circuits PWM may be separately controlled. For example, a second emission control transistor ET2 of a first PWM circuit PWM1 among three PWM circuits PWM is connected to the second emission control line to be applied with the second emission control signal EM2. A second emission control transistor ET2 of a second PWM circuit PWM2 among three PWM circuits PWM is connected to the third emission control line to be applied with the third emission control signal EM3. A second emission control transistor ET2 of a third PWM circuit PWM3 among three PWM circuits PWM is connected to the fourth emission control line to be applied with the fourth emission control signal EM4. Accordingly, the second emission control signal EM2, the third emission control signal EM3, and the fourth emission control signal EM4 are applied to the second emission control line, the third emission control line, and the fourth emission control line, respectively. Therefore, turning-on and turning-off operations of the second emission control transistors ET of the plurality of PWM circuits PWM may be independently controlled.

The second capacitor C2 is a capacitor which transmits a sweep signal of the sweep line to the sixth node N6 which is the gate electrode of the second driving transistor DT2. The second capacitor C2 includes a plurality of second capacitor C2 electrodes and a first second capacitor C2 electrode is connected to the sweep line and a second capacitor C2 electrode is connected to the third node N3 which is the gate electrode of the second driving transistor DT2. When the sweep signal is applied to one end of the second capacitor C2, a coupling voltage may generate in the gate electrode of the second driving transistor DT2. Accordingly, the voltage of the gate electrode of the second driving transistor DT2 is coupled to the sweep signal to be decreased or increased and the second driving transistor DT2 may be turned off or turned on.

The second capacitor C2 of each of the plurality of PWM circuits PWM may also be connected to different sweep lines. Each of the plurality of PWM circuits PWM is connected to a different sweep line to independently control an emission period of the light emitting diode EL connected to each of the plurality of PWM circuits PWM. For example, the second capacitor C2 of a first PWM circuit PWM1 among three PWM circuits PWM is connected to a first sweep line to be applied with a first sweep signal Sweep1. A second capacitor C2 of the second PWM circuit PWM2 among three PWM circuits PWM is connected to a second sweep line to be applied with a second sweep signal Sweep2. A second capacitor C2 of the third PWM circuit PWM3 among three PWM circuits PWM is connected to a third sweep line to be applied with a third sweep signal Sweep3. Accordingly, the first sweep signal Sweep1, the second sweep signal Sweep2, and the third sweep signal Sweep3 are applied to the first sweep line, the second sweep line, and the third sweep line to independently control the turning-on and turning-off operations of the second driving transistor DT2 which is coupled to the second capacitor C2 in each of the plurality of PWM circuits PWM.

One initialization transistor IT is connected to the sixth node of each of the plurality of PWM circuits PWM. That is, the plurality of PWM circuits PWM may share one initialization transistor IT. Therefore, the plurality of PWM circuits PWM includes one initialization transistor IT to reduce the number of overall transistors and simply the design.

The initialization transistor IT is a transistor which is connected to the sixth node N6 of each of the plurality of PWM circuits PWM and initializes a voltage of the gate electrode of the second driving transistor DT2. A gate electrode of the initialization transistor IT is connected to an initialization scan line, a source line is connected to the initialization line, and a drain line is connected to the sixth node N6 which is the gate electrode of the second driving transistor DT2. The initialization transistor IT is turned on by an initialization scan signal ISCAN of the initialization scan line to transmit an initialization voltage *Vini* from the initialization line to the gate electrode of the second driving transistor DT2.

Next, the light emitting diode EL is connected to the seventh node N7 of each of the plurality of PWM circuits PWM. The light emitting diode EL includes an anode and a cathode. The anode of the light emitting diode EL is connected to the seventh node N7 and the cathode is connected to the low potential power line VSS to which a low potential power voltage is supplied. Accordingly, the light emitting diode EL may emit light based on a driving current which is transmitted from the second driving transistor DT2 to the anode.

In the meantime, in the display device 1000 according to another exemplary embodiment of the present disclosure, each of the PAM circuit PAM and the plurality of PWM circuits PWM may compensate for a threshold voltage difference of the first driving transistor DT1 and the second driving transistor DT2 by an internal compensation method while the display device 1000 is driven.

Hereinafter, a driving process of the sub pixel SP of the display device 1000 according to another exemplary embodiment of the present disclosure will be described in more detail with reference to FIGS. 11 to 12F.

Figure 11:
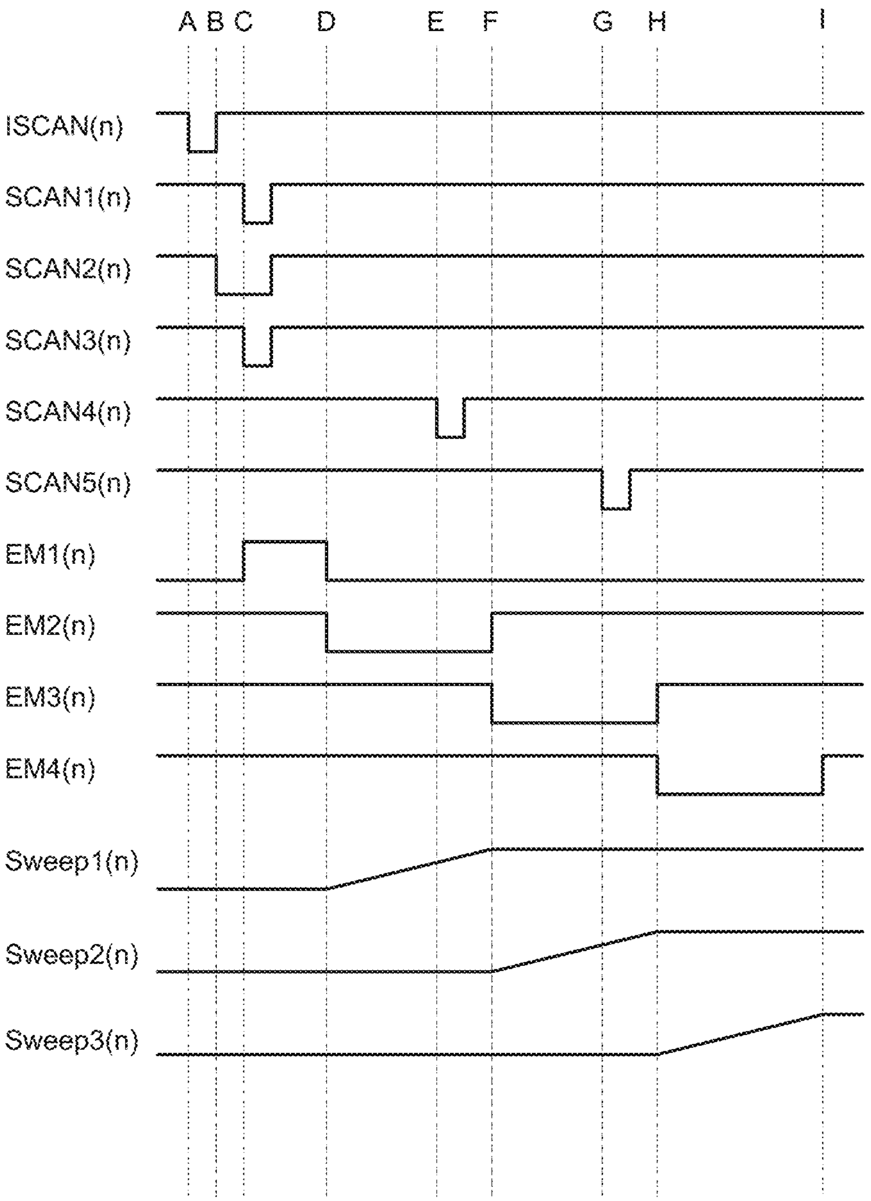
FIG. 11 is a driving timing diagram of a sub pixel of a display device according to another exemplary embodiment of the present disclosure.
Figure 12A:
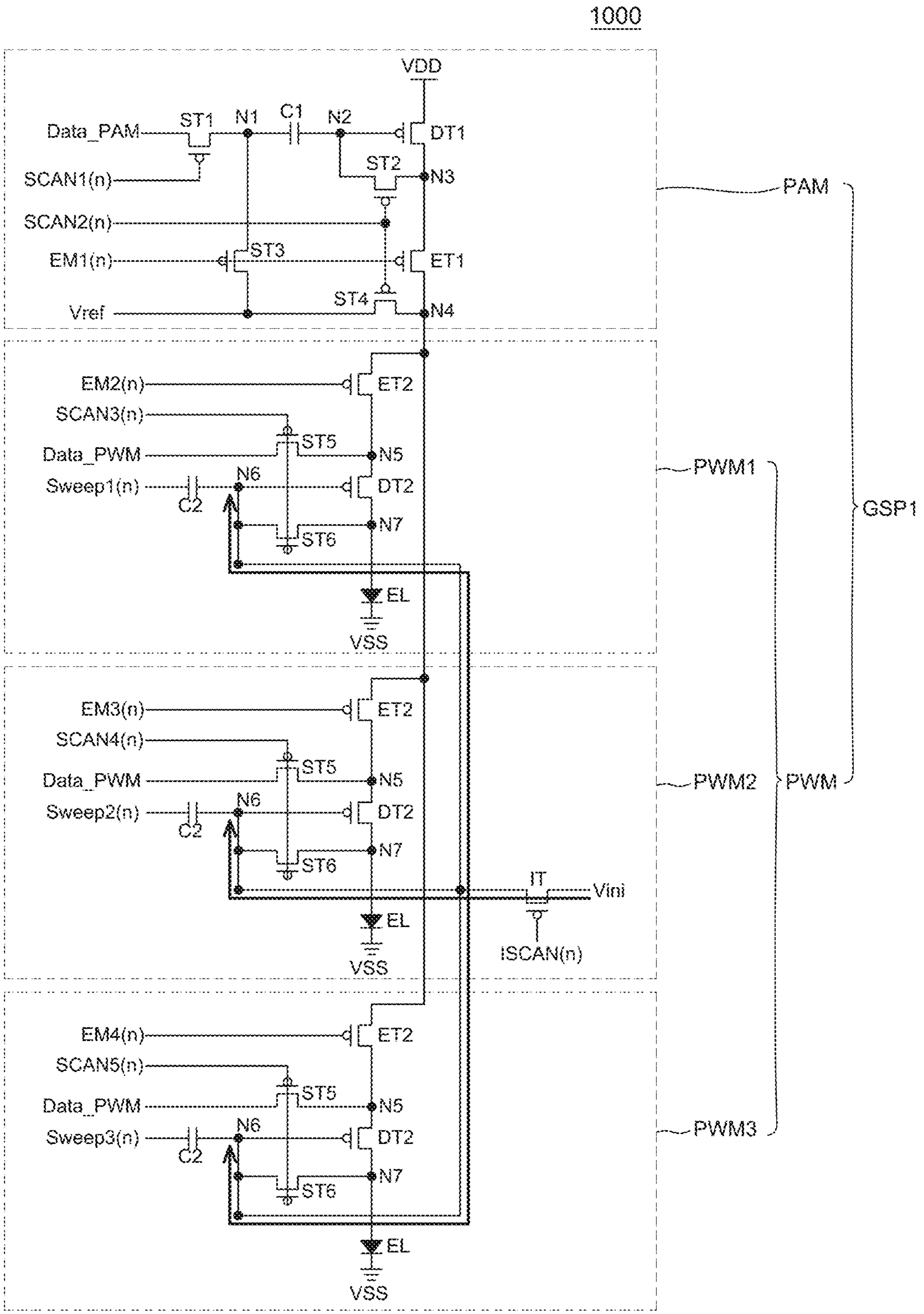
FIG. 12A is a circuit diagram of a first pixel group of a display device during a first initialization period according to another exemplary embodiment of the present disclosure.
Figure 12B:
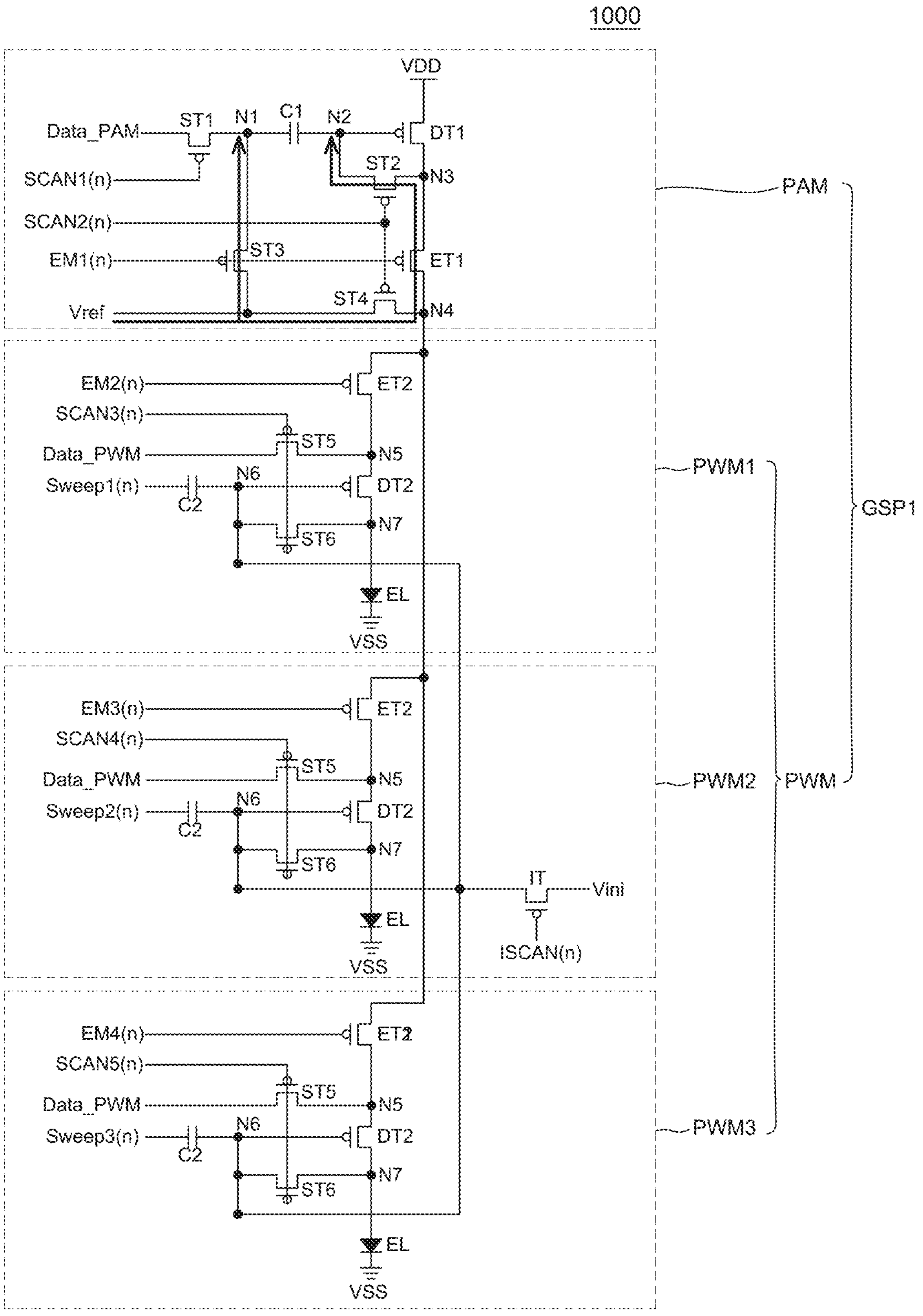
FIG. 12B is a circuit diagram of a first pixel group of a display device during a second initialization period according to another exemplary embodiment of the present disclosure.
Figure 12C:
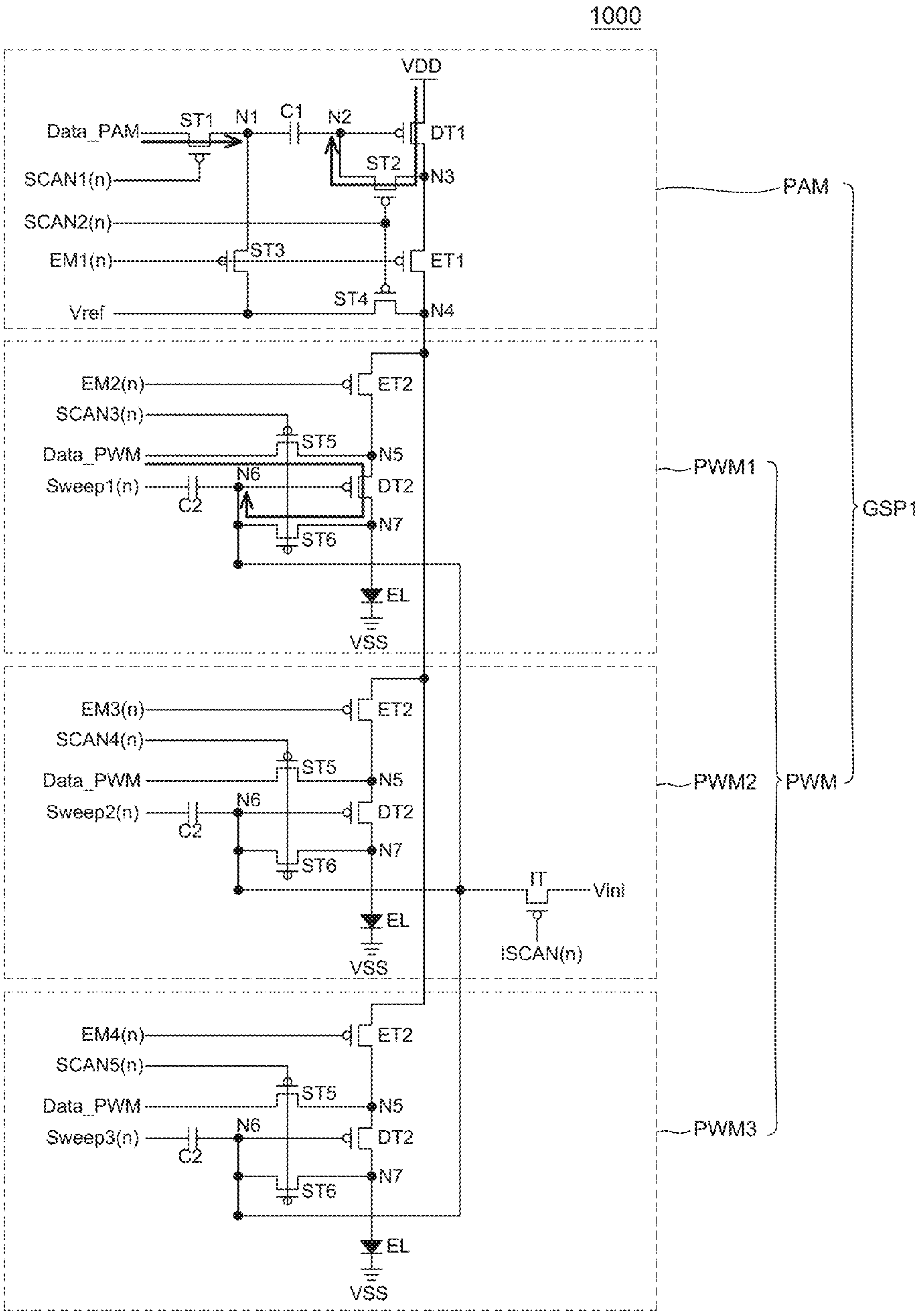
FIG. 12C is a circuit diagram of a first pixel group of a display device during a sampling and data writing period of a first PWM circuit according to another exemplary embodiment of the present disclosure.
Figure 12D:
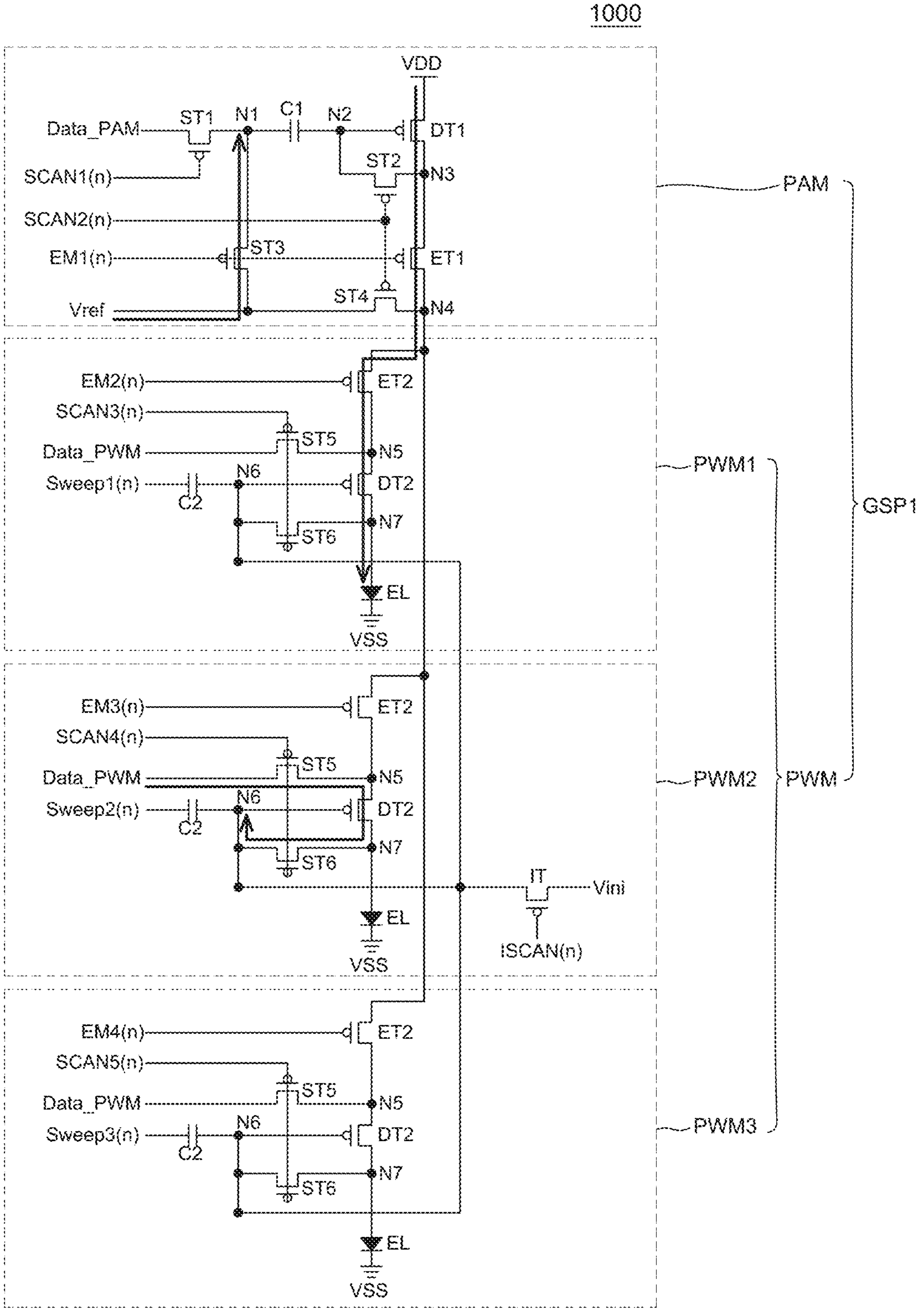
FIG. 12D is a circuit diagram of a first pixel group of a display device during an emission period of a first PWM circuit and a sampling and data writing period of a second PWM circuit according to another exemplary embodiment of the present disclosure.
Figure 12E:
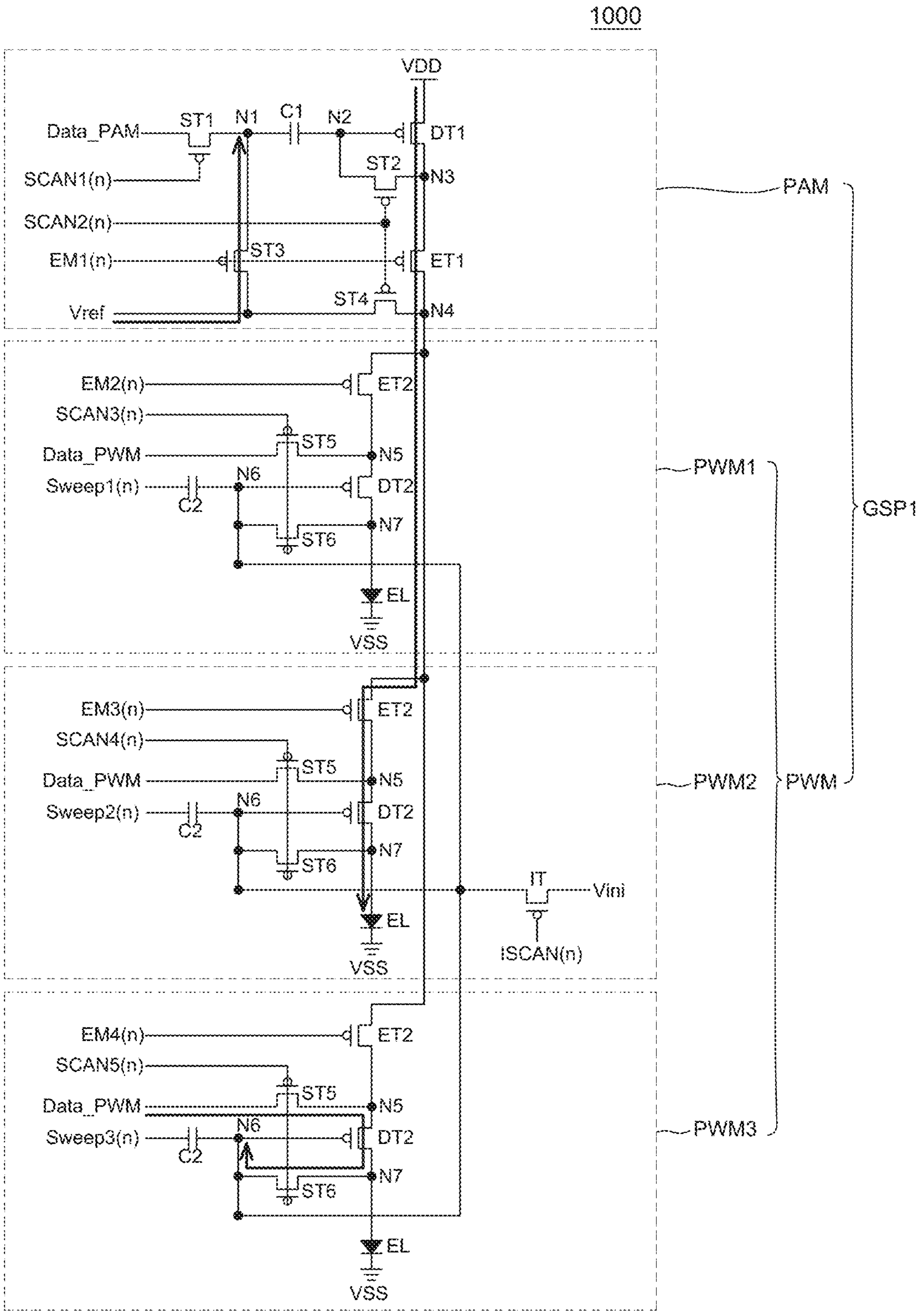
FIG. 12E is a circuit diagram of a first pixel group of a display device during an emission period of a second PWM circuit and a sampling and data writing period of a third PWM circuit according to another exemplary embodiment of the present disclosure.

FIG. 11 is a driving timing diagram of a sub pixel of a display device according to another exemplary embodiment of the present disclosure. FIG. 12A is a circuit diagram of a first pixel group of a display device during a first initialization period according to another exemplary embodiment of the present disclosure. FIG. 12B is a circuit diagram of a first pixel group of a display device during a second initialization period according to another exemplary embodiment of the present disclosure. FIG. 12C is a circuit diagram of a first pixel group of a display device during a sampling and data writing period of a first PWM circuit according to another exemplary embodiment of the present disclosure. FIG. 12D is a circuit diagram of a first pixel group of a display device disclosure during an emission period of a first PWM circuit and a sampling and data writing period of a second PWM circuit according to another exemplary embodiment of the present. FIG. 12E is a circuit diagram of a first pixel group of a display device during an emission period of a second PWM circuit and a sampling and data writing period of a third PWM circuit according to another exemplary embodiment of the present disclosure. FIG. 12F is a circuit diagram of a first pixel group of a display device during an emission period of a third PWM circuit according to another exemplary embodiment of the present disclosure.

Referring to FIG. 11, a plurality of sub pixels SP of the display device 1000 according to another exemplary embodiment of the present disclosure may be driven in the order of a first initialization period, a second initialization period, a sampling and data writing period, and an emission period. A period between the time A and the time B is the first initialization period and a period between the tine B and the time C is the second initialization period. A period when the first scan signal SCAN1 and the third scan signal SCAN3 are low levels from the time C is the sampling and data writing period of the PAM circuit PAM and the first PWM circuit PWM1. A period between the time D and the time F is an emission period of the light emitting diode EL connected to the first PWM circuit PWM1. A period when the fourth scan signal SCAN4 is a low level from the time E is a sampling and data writing period of the second PWM circuit PWM2 and a period between the time F and the time H is an emission period of the light emitting diode EL connected to the second PWM circuit PWM2. A period when the fifth scan signal SCAN5 is a low level from the time G is a sampling and data writing period of the third PWM circuit PWM3 and a period between the time H and the time I is an emission period of the light emitting diode EL connected to the third PWM circuit PWM3.

In the meantime, unlike the display device 100 according to the exemplary embodiment of the present disclosure which directly senses the threshold voltage of the driving transistor by the external compensation method, the display device 1000 according to another exemplary embodiment of the present disclosure uses an internal compensation method. According to the internal compensation method, when the data voltage is written, the threshold voltage of the driving transistor is sampled together to be compensated.

First, referring to FIGS. 11 and 12A, during the first initialization period between the time A and the time B, a low level of initialization scan signal ISCAN is output to the initialization scan line. Therefore, the initialization transistor IT connected to the initialization scan line through the gate electrode is turned on to apply the initialization voltage *Vini* to the sixth node N6 which is the gate electrode of the second driving transistor DT2 of the plurality of PWM circuits PWM. Accordingly, during the first initialization period, a voltage of the sixth node N6 which is a voltage of the gate electrode of the second driving transistor DT2 of the plurality of PWM circuits PWM may be initialized to the initialization voltage *Vini*.

Further, even though it is not illustrated in FIG. 12A, during the first initialization period between the time A and the time B, some nodes of the PAM circuit PAM may be also initialized to the reference voltage Vref. For example, during the period between the times A and B, a low level of first emission control signal EM1 is output to turn on the third switching transistor ST3 and the first emission control transistor ET1 to transmit the reference voltage Vref to the first node N1 and the third node N3.

Next, referring to FIGS. 11 and 12B, during the second initialization period between the time B and the time C, a low level of second scan signal SCAN2 is output to the second scan line. At this time, a low level of first emission control signal EM1 may be output to the first emission control line while outputting the low level of second scan signal SCAN2. Therefore, the second switching transistor ST2 and the fourth switching transistor ST4 of the PAM circuit PAM may be turned on by the second scan signal SCAN2 and the third switching transistor ST3 and the first emission control transistor ET1 may be turned on by the first emission control signal EM1. The reference voltage Vref may be transmitted to the fourth node N4, the third node N3, and the second node N2 through the fourth switching transistor ST4, the first emission control transistor ET1, and the second switching transistor ST2 which are turned on. The voltage of the gate electrode and the voltage of the drain electrode of the first driving transistor DT1 and the voltage of the fourth node N4 may be initialized to the reference voltage Vref. The reference voltage Vref may be applied to the first node N1 through the turned-on third switching transistor ST3. Accordingly, during the second initialization period between the time B and the time C, a voltage of both ends of the first capacitor C1 of the PAM circuit is initialized to the reference voltage Vref and the voltages of the gate electrode and the drain electrode of the first driving transistor DT1 may also be initialized to the reference voltage Vref.

Referring to FIGS. 11 and 12C, during a period when the third scan signal SCAN3 is output to a low level from the time C, that is, a sampling and data writing period of the PAM circuit PAM and the first PWM circuit PWM1, a low level of first scan signal SCAN1 is output to the first scan line and a low level of third scan signal SCAN3 is output to the third scan line. The second scan signal SCAN2 which starts outputting at the low level at the time B is continuously output at a low level also at the time C.

First, the first switching transistor ST1 of the PAM circuit PAM is turned on by a low level of first scan signal SCAN1 output at the time C and the first data voltage Data_PAM may be applied to the first node N1 through the turned-on first switching transistor ST1. At this time, the fourth switching transistor ST4 is turned on by the second scan signal SCAN2 which is continuously output at the low level and the reference voltage Vref may be applied to the fourth node N4. As the second switching transistor ST2 is turned on by the second scan signal SCAN2, the first driving transistor DT1 may be in a diode-connection state in which the gate electrode and the drain electrode of the first driving transistor DT1 are connected. In this case, the first driving transistor DT1 operates as a diode so that the current may flow from the source electrode to the drain electrode of the first driving transistor DT1. A voltage of the second node N2 and the third node N3 may have a value VDD+Vth obtained by adding a high potential power voltage and a threshold voltage of the first driving transistor DT1. Accordingly, during the period when the low level of first scan signal SCAN1 and second scan signal SCAN2 are simultaneously output from the time C, the voltage of the first node N1 of the PAM circuit PAM is a first data voltage DATA_PAM. Further, a voltage of the second node N2 may be a voltage VDD+Vth obtained by adding the high potential power voltage and the threshold voltage of the first driving transistor DT1.

Next, the fifth switching transistor ST5 and the sixth switching transistor ST6 of the first PWM circuit PWM1 may be turned on by the low level of third scan signal SCAN3 output at the time C. The second data voltage Data_PWM is applied to the fifth node N5 through the turned-on fifth switching transistor ST5 and the second driving transistor DT2 may be in a diode-connection state by the turned-on sixth transistor. A current flows in the second driving transistor DT2 in the diode-connection state by the second data voltage Data_PWM transmitted to the fifth node N5 which is the source electrode of the second driving transistor DT2. A voltage of the sixth node N6 which is the gate electrode of the second driving transistor DT2 may be a value Data_PWM+Vth obtained by adding the threshold voltage of the second driving transistor DT2 and the second data voltage Data_PWM. Accordingly, during a low level of third scan signal SCAN3 is simultaneously output from the time C, a voltage Data_PWM+Vth to which the threshold voltage of the second driving transistor DT2 and the second data voltage Data_PWM are reflected may be charged in the sixth node N6 and the second capacitor C2 connected to the sixth node N6.

Next, referring to FIGS. 11 and 12D, a period between the time D and the time F is an emission period of the light emitting diode EL connected to the first PWM circuit PWM1. A low level of first emission control signal EM1 is output to the first emission control line and a low level of second emission control signal EM2 is output to the second emission control line. Therefore, the first emission control transistor ET1 and the third switching transistor ST3 of the PAM circuit PAM are turned on and the second emission control transistor ET2 of the first PWM circuit PWM1 may be turned on.

First, in the PAM circuit PAM, the reference voltage Vref may be supplied to the first node N1 through the turned-on third switching transistor ST3. In this case, the voltage of the first node N1 drops from the first data voltage Data_PAM to the reference voltage Vref and a voltage variance of the first node N1 may be a value Data_PAM-Vref obtained by subtracting the reference voltage Vref from the first data voltage Data_PAM. Further, the second switching ST2 is turned off and the floated second node N2 is coupled to the first node N1 so that the voltage may vary according to the voltage change of the first node N1. For example, the voltage variance of the first node N1 is reflected to the second node N2 so that the voltage of the second node N2 may be lowered by a voltage variance of the first node N1 from the voltage VDD+Vth which is set in a previous period. Therefore, the voltage of the second node N2 may be a voltage VDD+Vth−(Vdata−Vref) obtained by subtracting a value obtained by subtracting the reference voltage Vref from the first data voltage Data_PAM, from the value obtained by adding the high potential power voltage and the threshold voltage of the first driving transistor DT1. That is, a voltage of the second node N2 which is the voltage of the gate electrode of the first driving transistor DT1 may be VDD+Vth−Vdata+Vref.

The gate-source voltage of the first driving transistor DT1 may be determined according to the voltage of the second node N2 and the driving current flowing through the first driving transistor DT1 may be determined by the gate-source voltage of the first driving transistor DT1. For example, the gate-source voltage is a value obtained by subtracting a voltage of the source electrode from a voltage of the gate electrode. The driving current may be determined based on a value obtained by subtracting the threshold voltage of the first driving transistor DT1 from the gate-source voltage of the first driving transistor DT1 as represented in the following Equation 1.

$$
\begin{aligned}
I &= K(Vgs - Vth)^2 \\
&= K((VDD + Vth - Vdata + Vref) - VDD) - Vth)^2 \\
&= K(Vda\square a - Vref)^2
\end{aligned}
\qquad \text{[Equation 1]}
$$

Accordingly, the driving current of the PAM circuit PAM which is supplied to each of the plurality of PWM circuits PWM is not affected by the threshold voltage of the first driving transistor DT1, but may be determined only by the first data voltage Data_PAM and the reference voltage Vref. Therefore, the threshold voltage of the first driving transistor DT1 of the PAM circuit PAM may be compensated through the second initialization period, the sampling and data writing period, and the emission period. In each of the plurality of sub pixels SP, the luminance difference according to the threshold voltage difference of the first driving transistor DT1 may be compensated.

Next, during the period between the time D and the time F, a low level of second emission control signal EM2 is output to the second emission control line to turn on the second emission control transistor ET2 of the first PWM circuit PWM1. The driving current from the PAM circuit PAM may flow to the second driving transistor DT2 of the first PWM circuit PWM1 through the turned-on second emission control transistor ET2. The driving current from the first driving transistor DT1 may flow from the third node N3 to the fourth node N4 through the turned-on first emission control transistor ET1 and flow to the second emission control transistor ET2 of each of the plurality of PWM circuits PWM. At this time, during the period between the time D and the time F, only the second emission control transistor ET2 of the first PWM circuit PWM1 is turned on to supply the driving current only to the fifth node N5 of the first PWM circuit PWM1. Accordingly, the driving current from the PAM circuit PAM may flow to the second driving transistor DT2 of the first PWM circuit PWM1 through the turned-on second emission control transistor ET2. That is, a predetermined voltage may be applied to the source electrode of the second driving transistor DT2 through the turned-on first driving transistor DT1 and the turned-on first emission control transistor ET1 of the PAM circuit PAM and the turned-on second emission control transistor ET2 of the first PWM circuit PWM1.

At this time, the driving current flowing in the second driving transistor DT2 may also be determined by the above Equation 1. In this case, the driving current flowing in the second driving transistor DT2 may be proportional to a value obtained by subtracting the threshold voltage Vth of the second driving transistor DT2 from the gate-source voltage which is a value obtained by subtracting the voltage of the fifth node N5 from the voltage Data_PWM+Vth of the gate electrode of the second driving transistor DT2. During a process of calculating a value obtained by subtracting the threshold voltage Vth of the second driving transistor DT2 from the gate-source voltage of the second driving transistor DT2, the threshold voltage of the second driving transistor DT2 may be cancelled out. The threshold voltage of the second driving transistor DT2 of the PWM circuit PWM may be compensated through the first initialization period, the sampling and data writing period, and the emission period. In each of the plurality of sub pixels SP, the luminance difference according to the threshold voltage difference of the second driving transistor DT2 may be compensated. Accordingly, the first PWM circuit PWM1 may also internally compensate for the threshold voltage of the second driving transistor DT2 by the same method as the PAM circuit PAM and the driving current flowing in the second driving transistor DT2 may be determined regardless of the threshold voltage of the second driving transistor DT2.

In the meantime, the voltage of the gate electrode of the second driving transistor DT2 of the first PWM circuit PWM1 may be coupled to the first sweep signal Sweep1 by the second capacitor C2 connected to the gate electrode. In this case, the voltage variance of the first sweep signal Sweep1 is reflected to the voltage of the gate electrode of the second driving transistor DT2 so that the voltage of the gate electrode may be changed and the second driving transistor DT2 may be turned on or turned off. For example, the first sweep signal Sweep1 gradually increases to increase the voltage of the gate electrode of the second driving transistor DT2 and when the voltage of the gate electrode is higher than the threshold voltage, the second driving transistor DT2 may be turned off. Therefore, the time when the driving current is supplied to the light emitting diode EL in the first PWM circuit PWM1 and an actual emission period of the light emitting diode EL may be controlled using the first sweep signal Sweep1. Accordingly, the driving current is supplied to the light emitting diode EL connected to the first PWM circuit PWM1 as long as a period when the second driving transistor DT2 is turned on by the first sweep signal Sweep1 in the period between the time D and the time E to allow the light emitting diode EL to emit light.

Next, a low level of fourth scan signal SCAN4 is output to the fourth scan line at the time E to turn on the fifth switching transistor ST5 and the sixth switching transistor ST6 of the second PWM circuit PWM2. A period when the light emitting diode EL connected to the first PWM circuit PWM1 emits light may overlap the sampling and data writing period of the second PWM circuit PWM2. In the second PWM circuit PWM2, the second data voltage Data_PWM is applied to the fifth node N5 through the turned-on fifth switching transistor ST5 and the second driving transistor DT2 may be in a diode-connection state by the turned-on sixth transistor. Therefore, the current may flow in the second driving transistor DT2 in the diode-connection state and a voltage of the sixth node N6 which is the gate electrode of the second driving transistor DT2 may be a value Data_PWM+Vth obtained by adding the threshold voltage of the second driving transistor DT2 and the second data voltage Data_PWM. Accordingly, the second data voltage Data_PWM may be charged while sampling the threshold voltage of the second driving transistor DT2 of the second PWM circuit PWM2 at the time E. For example, a voltage Data_PWM+Vth to which the threshold voltage of the second driving transistor DT2 and the second data voltage Data_PWM are reflected may be charged in the sixth node N6 of the second PWM circuit PWM2 and the second capacitor C2 connected to the sixth node N6.

Next, referring to FIGS. 11 and 12E, during the period between the time F and the time H, a low level of third emission control signal EM3 is output to the third emission control line to turn on the second emission control transistor ET2 of the second PWM circuit PWM2. Accordingly, the driving current from the PAM circuit PAM may flow to the second driving transistor DT2 of the second PWM circuit PWM2 through the turned-on second emission control transistor ET2. The second driving transistor DT2 of the second PWM circuit PWM2 may supply the driving current to the light emitting diode EL based on the second data voltage Data_PWM written in the previous time E and the second sweep signal Sweep2. At this time, the driving current flowing in the second driving transistor DT2 is not affected by the threshold voltage of the second driving transistor DT2 similar to the first PWM circuit PWM1 and may be determined by the second data voltage Data_PWM. Accordingly, an actual turn-on period of the second driving transistor DT2 of the second PWM circuit PWM2 may be determined according to the voltage change of the second sweep signal Sweep2 in the period between the time F and the time H. During the period between the time F and the time H, the driving current is supplied to the light emitting diode EL connected to the second PWM circuit PWM2 so that the light emitting diode EL may emit light.

At a time G in the period between the time F and the time H, a low level of fifth scan signal SCAN5 is output to the fifth scan line to turn on the fifth switching transistor ST5 and the sixth switching transistor ST6 of the third PWM circuit PWM3. A period when the light emitting diode EL connected to the second PWM circuit PWM2 emits light may overlap the sampling and data writing period of the third PWM circuit PWM3. In the third PWM circuit PWM3, the second data voltage Data_PWM is applied to the fifth node N5 through the turned-on fifth switching transistor ST5 and the second driving transistor DT2 may be in a diode-connection state by the turned-on sixth transistor. Therefore, the current flows in the second driving transistor DT2 in the diode-connection state and a voltage of the sixth node N6 which is the gate electrode of the second driving transistor DT2 may be a value Data_PWM+Vth obtained by adding the threshold voltage of the second driving transistor DT2 and the second data voltage Data_PWM. Accordingly, the second data voltage Data_PWM may be charged while sampling the threshold voltage of the second driving transistor DT2 of the third PWM circuit PWM3 at the time G. For example, a voltage Data_PWM+Vth to which the threshold voltage of the second driving transistor DT2 and the second data voltage Data_PWM are reflected may be charged in the sixth node N6 of the third PWM circuit PWM3 and the second capacitor C2 connected to the sixth node N6.

Figure 12F:
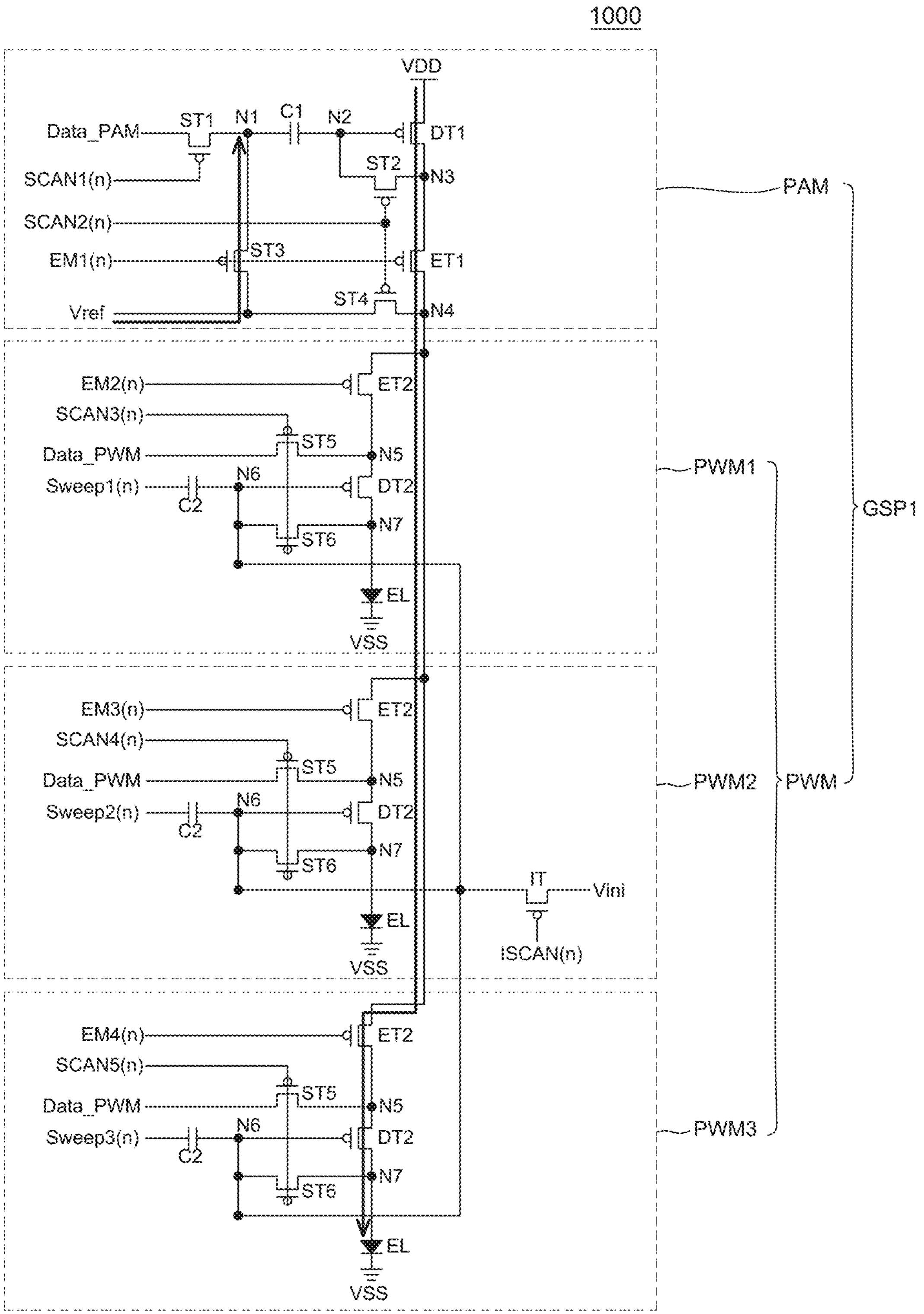
FIG. 12F is a circuit diagram of a first pixel group of a display device during an emission period of a third PWM circuit according to another exemplary embodiment of the present disclosure.

Finally, referring to FIGS. 11 and 12F, during the period between the time H and the time I, a low level of fourth emission control signal EM4 is output to the fourth emission control line to turn on the second emission control transistor ET2 of the third PWM circuit PWM3. Accordingly, the driving current from the PAM circuit PAM may flow to the second driving transistor DT2 of the third PWM circuit PWM3 through the turned-on second emission control transistor ET2. The second driving transistor DT2 of the third PWM circuit PWM3 may supply the driving current to the light emitting diode EL based on the second data voltage Data_PWM written in the previous time G and the third sweep signal Sweep3. At this time, the driving current flowing in the second driving transistor DT2 is not affected by the threshold voltage of the second driving transistor DT2 similar to the first PWM circuit PWM1 and the second PWM circuit PWM2 and may be determined by the second data voltage Data_PWM. Accordingly, an actual turn-on period of the second driving transistor DT2 of the third PWM circuit PWM3 may be determined according to the voltage change of the third sweep signal Sweep3 in the period between the time H and the time I. During period between the time H and the time I, the driving current is supplied to the light emitting diode EL connected to the third PWM circuit PWM3 so that the light emitting diode EL emits light.

Accordingly, in the display device 1000 according to another exemplary embodiment of the present disclosure, the threshold voltage difference of the first driving transistor DT1 of the PAM circuit PAM and the second driving transistor DT2 of the plurality of PWM circuits PWM is internally compensated. Therefore, the luminance difference between the plurality of sub pixels SP may be minimized. Specifically, in the PAM circuit, the second switching transistor ST2 which forms a diode connection of the first driving transistor DT1 is formed to sample the threshold voltage of the first driving transistor DT1. The driving current generated in the PAM circuit is generated based on a value obtained by subtracting the threshold voltage from the gate-source voltage of the first driving transistor DT1 so that the driving current which is finally generated may not be affected by the threshold voltage of the first driving transistor DT1. Further, also in the PWM circuit PWM, the sixth switching transistor ST6 which forms a diode connection of the second driving transistor DT2 is formed to sample the threshold voltage of the second driving transistor DT2. The threshold voltage is cancelled out during the process of writing the data voltage and generating the driving current so that the driving current may be compensated so as not to be changed according to the threshold voltage difference. Accordingly, in the display device 1000 according to another exemplary embodiment of the present disclosure, the threshold voltage difference of the first driving transistor DT1 of the PAM circuit PAM and the second driving transistor DT2 of the plurality of PWM circuits PWM is internally compensated to improve the luminance uniformity of the display device 1000 and improve a display quality.

The exemplary embodiments of the present disclosure can also be described as follows:

According to an aspect of the present disclosure, a display panel in which a plurality of pixel groups is defined, one PAM circuit disposed in each of the plurality of pixel groups, a plurality of PWM circuits which is disposed in each of the plurality of pixel groups and is connected to the one PAM circuit, and a plurality of light emitting diodes which is disposed in each of the plurality of pixel groups and is connected to the plurality of PWM circuits, in each of the plurality of pixel groups, the plurality of PWM circuits may be connected to an output terminal of the one PAM circuit in parallel.

The one PAM circuit may be configured to adjust an intensity of a driving current for driving the plurality of light emitting diodes based on a first data voltage.

The same first data voltage may be applied to the plurality of pixel groups, respectively.

The one PAM circuit may be configured to supply the driving current with the same intensity to the plurality of PWM circuits.

Each of the plurality of PWM circuits may be configured to adjust a pulse width of the driving current output from the one PAM circuit based on a second data voltage.

The second data voltage which is applied to each of the plurality of PWM circuits may vary based on a gray scale level of an image.

The display device may further include a plurality of emission control transistors which is connected between each of the plurality of PWM circuits and the one PAM circuit, the plurality of emission control transistors may be configured to connect or separate a driving current path between the one PAM circuit and the plurality of PWM circuits.

The display device may further include a plurality of emission control lines connected to gate electrodes of the plurality of emission control transistors, each of the plurality of emission control transistors may be connected to a different emission control line among the plurality of emission control lines.

The one PAM circuit may include a first driving transistor which controls an intensity of the driving current based on the first data voltage and each of the plurality of PWM circuits may include a second driving transistor which controls a time to supply the driving current to the plurality of light emitting diodes based on the second data voltage.

An emission period of each of the plurality of light emitting diodes may be the same as a period when the second driving transistor is turned on in a turned-on state of the plurality of emission control transistors.

The one PAM circuit may further include a first sensing transistor connected to the first driving transistor and each of the plurality of PWM circuits may further include a second sensing transistor connected to the second driving transistor.

The display device may further include a third sensing transistor which is connected to the second driving transistor of each of the plurality of PWM circuits to supply a sensing voltage to the second driving transistor, any one of a source electrode and a drain electrode of the first driving transistor may be connected to a high potential power line and the other may be connected to the first sensing transistor and any one of a source electrode and a drain electrode of the second driving transistor may be connected to the third sensing transistor and the other may be connected to the second sensing transistor.

The one PAM circuit may further include a first capacitor having one end connected to a gate electrode of the first driving transistor, a first switching transistor which is connected to the other end of the first capacitor to transmit the first data voltage to the first capacitor, and a second switching transistor which is connected between any one of a source electrode and a drain electrode of the first driving transistor and the gate electrode of the first driving transistor, and the second switching transistor may be configured to be turned on to form diode-connection of the first driving transistor.

Each of the plurality of PWM circuits may further include a second capacitor having one end connected to a gate electrode of the second driving transistor, a fifth switching transistor which is connected to the second driving transistor to transmit the second data voltage to the second driving transistor; and a sixth switching transistor which is connected between any one of a source electrode and a drain electrode of the second driving transistor and the gate electrode of the second driving transistor, and the sixth switching transistor may be configured to be turned on to form diode-connection of the second driving transistor.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. All the technical concepts in the equivalent scope of the present disclosure should be construed as falling within the scope of the present disclosure.

What is claimed is:

1. A display device, comprising:

a display panel including a plurality of pixel groups, each of the plurality of pixel groups including a plurality of light emitting diodes;

a plurality of pulse amplitude modulation (PAM) circuits, each of the plurality of pixel groups including a respective PAM circuit; and a set of pulse width modulation (PWM) circuits, wherein a corresponding plurality of PWM circuits from the set are included in each of the plurality of pixel groups, a set of light emitting diodes of the plurality of light emitting diodes within the corresponding plurality of PWM circuits receiving a driving current from the respective PAM circuit, wherein in each of the plurality of pixel groups, the corresponding plurality of PWM circuits are connected in parallel to an output terminal of the respective PAM circuit.

2. The display device according to claim 1, wherein a PAM circuit from the plurality of PAM circuits is configured to adjust an intensity of the driving current that drives the plurality of light emitting diodes that are included in the pixel group that is connected to the PAM circuit based on a first data voltage.

3. The display device according to claim 2, wherein the first data voltage is applied to the plurality of pixel groups.

4. The display device according to claim 3, wherein the PAM circuit is configured to supply the driving current with a same intensity to the plurality of PWM circuits that is connected to the PAM circuit.

5. The display device according to claim 2, wherein each of the plurality of PWM circuits that is connected to the PAM circuit is configured to adjust a pulse width of the driving current output from the PAM circuit based on a second data voltage.

6. The display device according to claim 5, wherein the second data voltage that is applied to each of the plurality of PWM circuits in the set is based on a gray scale level of an image.

7. The display device according to claim 5, further comprising:

a plurality of emission control transistors, each emission control transistor connected to the PAM circuit and a PWM circuit from the corresponding plurality of PWM circuits that are connected to the PAM circuit, wherein each emission control transistor is configured to connect or disconnect a driving current path between the PAM circuit and the corresponding plurality of PWM circuits.

8. The display device according to claim 7, further comprising:

a plurality of emission control lines connected to gate electrodes of the plurality of emission control transistors, wherein each of the plurality of emission control transistors is connected to a different emission control line from the plurality of emission control lines.

9. The display device according to claim 7, wherein the PAM circuit includes a first driving transistor that controls the intensity of the driving current based on the first data voltage and each of the plurality of PWM circuits includes a second driving transistor that controls a time to supply the driving current to the plurality of light emitting diodes based on the second data voltage.

10. The display device according to claim 9, wherein an emission period of each of the plurality of light emitting diodes in the pixel group is a same as a period during which second driving transistors of the corresponding plurality of PWM circuits and the plurality of emission control transistors are turned on.

11. The display device according to claim 9, wherein the PAM circuit further comprises a first sensing transistor that is connected to the first driving transistor of the PAM circuit and each of the corresponding plurality of PWM circuits further includes a second sensing transistor that is connected to the second driving transistor that is included in the PWM circuit.

12. The display device according to claim 11, further comprising:

a plurality of third sensing transistors, each third sensing transistor connected to a corresponding second driving transistor from the corresponding plurality of PWM circuits and supplying a sensing voltage to the corresponding second driving transistor, wherein any one of a source electrode and a drain electrode of each first driving transistor is connected to a high potential power line and the other of the source electrode and the drain electrode of the first driving transistor is connected to the first sensing transistor, and any one of a source electrode and a drain electrode of the second driving transistor is connected to the third sensing transistor and the other of the source electrode and the drain electrode of the second driving transistor is connected to the second sensing transistor.

13. The display device according to claim 9, wherein the PAM circuit further comprises:

a first capacitor having a first end connected to a gate electrode of the first driving transistor and a second end;

a first switching transistor that is connected to the second end of the first capacitor, the first switching transistor transmitting the first data voltage to the first capacitor; and a second switching transistor that is connected to any one of a source electrode and a drain electrode of the first driving transistor and the gate electrode of the first driving transistor, the second switching transistor is configured to be turned on and diode-connect the first driving transistor.

14. The display device according to claim 13, wherein each of the corresponding plurality of PWM circuits further includes:

a second capacitor having a first end connected to a gate electrode of the second driving transistor;

a fifth switching transistor that is connected to the second driving transistor, the fifth switching transistor transmitting the second data voltage to the second driving transistor; and a sixth switching transistor that is connected to any one of a source electrode and a drain electrode of the second driving transistor and the gate electrode of the second driving transistor, the sixth switching transistor configured to be turned on and diode-connect the second driving transistor.

15. A display device comprising:

a plurality of light emitting elements that emit a same color of light;

a pulse amplitude modulation (PAM) circuit, the PAM including a first driving transistor that controls an intensity of a driving current that is generated by the PAM circuit based on a first data voltage; and a plurality of pulse width modulation (PWM) circuits that are electrically connected to the PAM circuit and receive the driving current generated by the PAM circuit, wherein a set of light emitting elements of the plurality of light emitting elements within the plurality of PWM circuits receive the driving current from the PAM circuit, and wherein each of the PWM circuits includes a second driving transistor that is connected to a corresponding light emitting element from the plurality of light emitting elements and controls a duration of time that the driving current from the PAM circuit is supplied to the corresponding light emitting element based on a second data voltage that has a magnitude that is image dependent.

16. The display device of claim 15, wherein the first data voltage has a constant value.

17. The display device of claim 16, wherein the second data voltage has a first magnitude that corresponds to a first image at a first time such that the driving current is supplied to the second driving transistor for a first duration and the second data voltage has a second magnitude that corresponds to a second image at a second time such that the driving current is supplied to the second driving transistor for a second duration that is different from the first duration.

18. The display device of claim 15, further comprising:

a plurality of emission control transistors, each emission control transistor connected to the PAM circuit and a corresponding PWM circuit from the plurality of PWM circuits, wherein each emission control transistor is configured to connect or disconnect the PAM circuit from the corresponding PWM circuit.

19. The display device according to claim 18, further comprising:

a plurality of emission control lines connected to gate electrodes of the plurality of emission control transistors, wherein each of the plurality of emission control transistors is connected to a different emission control line from the plurality of emission control lines.

20. The display device according to claim 18, wherein the first driving transistor includes a gate electrode, a first electrode, and a second electrode that is connected to each of the plurality of emission control transistors, and the PAM circuit further comprises:

a first switching transistor including a gate electrode that receives a first scan signal, a first electrode that receives the first driving voltage, and a second electrode connected to the gate electrode of the first driving transistor, the first switching transistor configured to supply the first driving voltage to the gate electrode of the first driving transistor responsive to the first scan signal;

a first sensing transistor including a gate electrode that receives a sensing signal, a first electrode that is connected to the second electrode of the first driving transistor and each of the plurality of emission control transistors, and a second electrode that is connected to a reference line; and a first capacitor connected to the gate electrode of the first driving transistor and the second electrode of the first driving transistor.

21. The display device according to claim 20, wherein each second driving transistor includes a gate electrode, a first electrode, and a second electrode of the second driving transistor, and each of the plurality of the PWM circuits further comprises:

a second switching transistor including a gate electrode that receives a second scan signal, a first electrode that receives the second data voltage, and a second electrode connected to the gate electrode of the second driving transistor, the second switching transistor configured to supply the second data voltage to the gate electrode of the second driving transistor responsive to the second scan signal;

a second sensing transistor including a gate electrode that receives the sensing signal, a first electrode that is connected to the second electrode of the second driving transistor and the light emitting element, and a second electrode that is connected to the reference line;

a second capacitor connected to the gate electrode of the second driving transistor; and a third capacitor connected to the gate electrode of the second driving transistor and the second electrode of the second driving transistor and the first electrode of the second sensing transistor.

22. The display device according to claim 21, wherein the plurality of PWM circuits further comprise:

a third sensing transistor including a gate electrode that receives a third scan signal, a first electrode that is connected to the first electrode of each of the second driving transistors that are included in the plurality of PWM circuits, and a second electrode that is connected to a sensing line.

23. The display device according to claim 18, wherein the first driving transistor includes a gate electrode, a first electrode, and a second electrode that is connected to each of the plurality of emission control transistors, and the PAM circuit further comprises:

a first capacitor having a first end connected to a gate electrode of the first driving transistor and a second end;

a first switching transistor including a gate electrode that receives a scan signal, a first electrode that receives the first data voltage, and a second electrode connected to the second end of the first capacitor, the first switching transistor transmitting the first data voltage to the first capacitor responsive to the first scan signal;

a second switching transistor including a gate electrode that receives a second scan signal, a first electrode that is connected to the gate electrode of the first driving transistor, and a second electrode that is connected to the second electrode of the first driving transistor, the second switching transistor is configured to be turned on and diode-connect the first driving transistor responsive to the second scan signal;

a third switching transistor including a gate electrode that receives an emission signal, a first electrode that is connected to the second electrode of the first switching transistor and the second end of the first capacitor, and a second electrode that is connected to a reference line; and a fourth switching transistor including a gate electrode that is connected to the gate electrode of the second switching transistor and receives the second scan signal, a first electrode that is connected to the reference line and the second electrode of the third switching transistor, and a second electrode that is connected to the plurality of emission control transistors.

24. The display device according to claim 23, wherein each second driving transistor includes a gate electrode, a first electrode, and a second electrode of the second driving transistor and each of the plurality of PWM circuits further includes:

a second capacitor having a first end connected to the gate electrode of the second driving transistor;

a fifth switching transistor including a gate electrode that receives a third scan signal, a first electrode that receives the second data voltage, and a second electrode that is connected to the first electrode of the second driving transistor, the fifth switching transistor transmitting the second data voltage to the second driving transistor responsive to the third scan signal; and a sixth switching transistor including a gate electrode that is connected to the gate electrode of the fifth switching transistor and the gate electrode of the second driving transistor and receives the third scan signal, a first electrode connected to the first end of the second capacitor and the second electrode of the second driving transistor, and a second electrode that is connected to the second electrode of the second driving transistor and the light emitting element.

25. The display device of claim 24, wherein the plurality of PWM circuits further comprises:

an initialization transistor including a gate electrode that receives an initialization scan signal, a first electrode that receives an initialization voltage, and a second electrode that is connected to the gate electrode of each of the second driving transistors and the first electrode of each of the sixth switching transistors.

* * * * *